(12) United States Patent
Zhou et al.

(10) Patent No.: US 10,766,004 B2
(45) Date of Patent: Sep. 8, 2020

(54) COMPOSITE MEMBRANES AND METHODS OF USE

(71) Applicant: 3M INNOVATIVE PROPERTIES COMPANY, St. Paul, MN (US)

(72) Inventors: Jinsheng Zhou, Woodbury, MN (US); Ryan C. Shirk, Mendota Heights, MN (US); David Scott Seitz, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 161 days.

(21) Appl. No.: 15/108,892

(22) PCT Filed: Dec. 24, 2014

(86) PCT No.: PCT/US2014/072310
§ 371 (c)(1),
(2) Date: Jun. 29, 2016

(87) PCT Pub. No.: WO2015/103063
PCT Pub. Date: Jul. 9, 2015

(65) Prior Publication Data
US 2016/0325229 A1    Nov. 10, 2016

Related U.S. Application Data

(60) Provisional application No. 61/921,640, filed on Dec. 30, 2013.

(51) Int. Cl.
*B01D 61/36* (2006.01)
*B01D 71/52* (2006.01)
(Continued)

(52) U.S. Cl.
CPC ......... *B01D 61/362* (2013.01); *B01D 61/366* (2013.01); *B01D 67/0006* (2013.01);
(Continued)

(58) Field of Classification Search
CPC .... B01D 61/362; B01D 61/366; B01D 71/40; B01D 71/42; B01D 71/44; B01D 71/48;
(Continued)

(56) References Cited

U.S. PATENT DOCUMENTS 4,872,982 A   10/1989 Taylor
5,256,503 A   10/1993 Cook et al.
(Continued)

FOREIGN PATENT DOCUMENTS

CN   202150515   2/2012
EP   0526203     2/1993
(Continued)

OTHER PUBLICATIONS

Smitha, B., Suhanya, D., Sridhar, S., & Ramakrishna, M. (2004). Separation of organic-organic mixtures by pervaporation—a review. Journal of Membrane Science, 241, 1-21. (Year: 2004).*
(Continued)

*Primary Examiner* — Liam Royce
(74) *Attorney, Agent, or Firm* — Harold C. Knecht, III

(57) ABSTRACT

A composite membrane for selectively pervaporating a first liquid from a mixture comprising the first liquid and a second liquid. The composite membrane includes a porous substrate comprising opposite first and second major surfaces, and a plurality of pores. A pore-filling polymer is disposed in at least some of the pores so as to form a layer having a thickness within the porous substrate. The polymer is more permeable to the first liquid than the second liquid but not soluble in the first liquid or the second liquid. The composite membrane may be asymmetric or symmetric with respect to the amount of pore-filling polymer throughout the thickness of the porous substrate.

19 Claims, 11 Drawing Sheets

(51) Int. Cl.
| | |
|---|---|
| *B01D 69/10* | (2006.01) |
| *B01D 69/12* | (2006.01) |
| *B01D 67/00* | (2006.01) |
| *B01D 71/42* | (2006.01) |
| *B01D 71/44* | (2006.01) |
| *B01D 71/40* | (2006.01) |
| *B01D 71/48* | (2006.01) |
| *B01D 71/70* | (2006.01) |

(52) U.S. Cl.
CPC ......... *B01D 67/0095* (2013.01); *B01D 69/10* (2013.01); *B01D 69/12* (2013.01); *B01D 69/125* (2013.01); *B01D 71/40* (2013.01); *B01D 71/42* (2013.01); *B01D 71/44* (2013.01); *B01D 71/48* (2013.01); *B01D 71/52* (2013.01); *B01D 71/70* (2013.01); *B01D 2323/30* (2013.01); *B01D 2323/345* (2013.01); *B01D 2323/46* (2013.01); *B01D 2325/022* (2013.01)

(58) Field of Classification Search
CPC .... B01D 71/70; B01D 71/52; B01D 67/0095; B01D 67/0006; B01D 69/125; B01D 2325/022; B01D 2323/345; B01D 2323/46; B01D 2323/30
See application file for complete search history.

(56) References Cited

U.S. PATENT DOCUMENTS

| | | | |
|---|---|---|---|
| 5,425,865 A | 6/1995 | Singleton et al. | |
| 5,468,390 A | 11/1995 | Crivello et al. | |
| 5,547,551 A | 8/1996 | Bahar et al. | |
| 5,550,199 A | 8/1996 | Ho et al. | |
| 5,670,052 A | 9/1997 | Ho et al. | |
| 6,586,133 B1 | 7/2003 | Teeters et al. | |
| 6,972,093 B2 | 12/2005 | Partridge et al. | |
| 7,225,787 B2 | 6/2007 | Bromberg et al. | |
| 7,247,370 B2 | 7/2007 | Childs et al. | |
| 7,290,505 B2 | 11/2007 | Kamio et al. | |
| 7,314,033 B2 | 1/2008 | Cohn et al. | |
| 7,389,751 B2 | 6/2008 | Leone | |
| 7,426,907 B2 | 9/2008 | Dearth et al. | |
| 7,444,987 B2 | 11/2008 | Cohn et al. | |
| 7,604,746 B2 | 10/2009 | Childs et al. | |
| 7,640,915 B2 | 1/2010 | Cohn et al. | |
| 7,647,899 B2 | 1/2010 | Dearth et al. | |
| 7,708,151 B2 | 5/2010 | Peiffer et al. | |
| 7,740,004 B2 | 6/2010 | Cohn et al. | |
| 7,749,387 B2 | 7/2010 | Sabottke et al. | |
| 7,785,471 B2 | 8/2010 | Sabottke et al. | |
| 7,910,012 B2 | 3/2011 | Yeager et al. | |
| 8,083,946 B2 | 12/2011 | Sabottke et al. | |
| 8,119,006 B2 | 2/2012 | Patil et al. | |
| 8,161,946 B2 | 4/2012 | Pursifull | |
| 8,550,058 B2* | 10/2013 | Pursifull ............ | F02M 63/0225 123/1 A |
| 2002/0161066 A1 | 10/2002 | Remigy et al. | |
| 2010/0062186 A1 | 3/2010 | Peiffer et al. | |
| 2010/0226823 A1 | 9/2010 | Rakhman et al. | |
| 2011/0091698 A1* | 4/2011 | Zhou ................ | B01D 67/0006 428/212 |
| 2011/0204059 A1 | 8/2011 | Kamino | |
| 2012/0203442 A1 | 8/2012 | Pursifull | |
| 2013/0118983 A1 | 5/2013 | Linvingston et al. | |
| 2013/0133249 A1 | 5/2013 | Drury et al. | |

FOREIGN PATENT DOCUMENTS

| | | | |
|---|---|---|---|
| EP | 0592706 | | 4/1994 |
| EP | 811420 | | 12/1997 |
| EP | 2138222 A1 * | 12/2009 | ........... B01D 65/106 |
| FR | 2937468 | | 4/2010 |
| JP | 05237352 | | 9/1993 |
| JP | 2010236454 | | 10/2010 |
| WO | WO 97/017129 | | 5/1997 |
| WO | WO 03/008078 | | 1/2003 |
| WO | WO 2005/102503 | | 11/2005 |
| WO | WO 2010/002501 | | 1/2010 |
| WO | WO 2011/150124 | | 12/2011 |
| WO | WO 2011/152967 | | 12/2011 |

OTHER PUBLICATIONS

Lee, Y.K. et. al. 1990 "Cationic/anionic interpenetrating polymer network membranes for the pervaporation of ethanol-water mixtures" Journal of Membrane Science:52,157-172. (Year: 1990).*
SOCRATIC 2014 "How can a solute dissolve in polar and nonpolar solvents?" https://socratic.org/questions/how-can-a-solute-dissolve-in-polar-and-nonpolar-solvents (Year: 2014).*
Kim SJ, Lee CK, Lee YM, Kim SI. 2003. Preparation and Characterization of Thermosensitive Poly(N-isopropylacrylamide)/Poly(ethylene oxide) Semi-Interpenetrating Polymer Networks. Journal of Applied Polymer Science 90:3032-3036. (Year: 2003).*
Chu, "Preparation of Thermo-Responsive Core-Shell Microcapsules With a Porous Membrane and Poly(N-Isopropylacrylamide) Gates," Journal of Membrane Science, Oct. 2001, vol. 192, No. 1-2, pp. 27-39.
Frahn, "Generation of a Selective Layer on Polyacrylonitrile Membrane Supports for Separation of Aromatic/Non-Aromatic Hydrocarbon Mixtures by Pervaporation," Macromolecular Symposium, Feb. 2001, vol. 164, No. 1, pp. 269-276.
Frahn, "Separation of Aromatic /Aliphatic Hydrocarbons by Photo-Modified Poly(Acrylonitrile) Membranes," Journal of Membrane Science, May 2004, vol. 234, No. 1-2, pp. 55-65.
Garcia-Aleman, "Experimental Analysis, Modeling, and Theoretical Design of McMaster Pore-Filled Nanofiltration Membranes," Journal of Membrane Science, Sep. 2004, vol. 240, No. 1-2, pp. 237-255.
Kim "Quantitative Microscopic Study of Surface Characteristics of Ultrafiltration Membranes," Journal of Membrane Science, Nov. 1990, vol. 54, No. 1-2, pp. 89-102.
Kim, "Selective Permeation of $CO_2$ Through Pore-Filled Polyacrylonitrile Membrane With Poly(Ethylene Glycol)", Journal of Membrane Science, May 2001, vol. 186, No. 1, pp. 97-107.
Kudo, "Research on Engine System Making Effective Use of Bio-Ethanol-Blended Fuels" Japan Society of Automotive Engineers Technical Paper (JSAE Paper No. 20135048), May 2013, pp. 1-4.
Li, "A Novel Atmospheric Dielectric Barrier Discharge (DBD) Plasma Graft-Filling Technique to Fabricate the Composite Membranes for Pervaporation of Aromatic/Aliphatic Hydrocarbons," Journal of Membrane Science, Apr. 2011, vol. 371, No. 1-2, pp. 163-170.
Lin, "Recent Advances in Sulfur Removal From Gasoline by Pervaporation," Fuel, Oct. 2009, vol. 88, No. 10, pp. 1799-1809.
Mika, "Ultra-Low-Pressure Water Softening With Pore-Filled Membranes," Desalination, Nov. 2001, vol. 140, No. 3, pp. 265-275.
Navarro, Pore-Filling Electrolyte Membranes Based on Microporous Polyethylene Matrices Activated with Plasma and Sulfonated Hydrogenated Styrene Butadiene Block Copolymer. Synthesis, Microstructural and Electrical Characterization, Journal of Polymer Science, Part B: Polymer Physics, Aug. 2008; vol. 46, No. 16, pp. 1684-1695.
Pandey, "Formation and Characterization of Highly Crosslinked Anion Exchanged Membranes," Journal of Membrane Science, Jun. 2003, vol. 217, No. 1-2, pp. 117-130.
Peeva "Factors Affecting the Sieving Behavior of Anti-Fouling Thin-Layer Cross-Linked Hydrogel Polyethersulfone Composite Ultrafiltration Membranes," Journal of Membrane Science, Feb. 2012, vol. 390-391, pp. 99-112.
Qiu, "Nanofiltration Membrane Prepared From Cardo Polyetherketone Ultrafiltration Membrane by UV-Induced Grafting Method," Journal of Membrane Science, Jun. 2005, vol. 255, No. 1-2, pp. 107-115.
Sato, "Pd Membrane With Low Metal Content for Hydrogen Separation and a Catalytic Membrane Reactor Combined With a

(56) References Cited

OTHER PUBLICATIONS

Microwave Heating System," Transactions of the Materials Research Society of Japan, 2011, vol. 36, No. 2, pp. 221-224.

Scindia, "Coupled Diffusion Transport of Cr (VI) Across Anion-Exchange Membranes Prepared by Physical and Chemical Immobilization Methods," Journal of Membrane Science, Mar. 2005, vol. 249, No. 1-2, pp. 143-152.

Ulbricht, "Novel High Performance Photo Graft Composite Membranes for Separation of Organic Liquids by Pervaporation," Journal of Membrane Science, Dec. 1997, vol. 136, No. 1-2, pp. 25-33.

Wang, "Self-initiated Photopolymerization and Photografting of Acrylic Monomers," Macromolecular Rapid Communications, Jun. 2004, vol. 25, No. 11, pp. 1095-1099.

Wang, "Preparation and Properties of Pore-Filling Membranes Based on Sulfonated Copolyimides and Porous Polyimide Matrix," Polymer, Jul. 2012, vol. 53, No. 15, pp. 3154-3162.

Wight, "Oxygen Inhibition of Acrylic Photopolymerization," Journal of Polymer Science Part C: Polymer Letters Edition, Mar. 1978, vol. 16, No. 3, pp. 121-127.

Yamaguchi, "A Pore-Filling Electrolyte Membrane-Electrode Integrated System for a Direct Methanol Fuel Cell Application," Journal of the Electrochemical Society, 2002, vol. 149, No. 11, pp. A1448-A1453.

Yamaguchi, "An Extremely Low Methanol Crossover and Highly Durable Aromatic Pore-Filling Electrolyte Membrane for Direct Methanol Fuel Cells," Advanced Material, Feb. 2007, vol. 19, No. 4, pp. 592-596.

Yamaguchi, "Plasma-Graft Filling Polymerization: Preparation of a New Type of Pervaporation Membrane for Organic Liquid Mixtures," Macromolecules, Sep. 1991, vol. 24, No. 20, pp. 5522-5527.

Yucesu, "Effect of Ethanol-Gasoline Blends on Engine Performance and Exhaust Emissions in Different Compression Ratios," Applied Thermal Engineering, Dec. 2006, vol. 26, pp. 2272-2278.

International Search Report for PCT International Application No. PCT/US2014/072310, dated Mar. 25, 2015, 4 pages.

* cited by examiner 0.5μm

Top of sample

COMPOSITE MEMBRANES AND METHODS OF USE

CROSS REFERENCE TO RELATED APPLICATIONS

This application is a national stage filing under 35 U.S.C. 371 of PCT/US2014/072310, filed Dec. 24, 2014, which claims the benefit of U.S. Provisional Application No. 61/921,640, filed Dec. 30, 2013, the disclosures of which are incorporated by reference in their entireties herein.

BACKGROUND

Separation membranes are known; however, there is a continual need for effective composite membranes.

SUMMARY OF THE DISCLOSURE

The present disclosure provides composite membranes and methods of use of such membranes in separation techniques. Generally, the composite membranes include a porous substrate (i.e., a support substrate that may include one or more layers) that includes opposite first and second major surfaces, and a plurality of pores; and a pore-filling polymer disposed in at least some of the plurality of pores so as to form a layer having a thickness within the porous substrate. In certain embodiments the layer is a continuous layer. For composite membranes that are asymmetric, the amount of the polymer at or adjacent to the first major surface is greater than the amount of the polymer at or adjacent to the second major surface.

Such membranes are particularly useful for selectively pervaporating a first liquid from a mixture that includes the first liquid and a second liquid, generally because the pore-filling polymer is more permeable to the first liquid than the second liquid. Furthermore, the pore-filling polymer is not soluble in the first liquid or the second liquid.

In one embodiment, the present disclosure provides an asymmetric composite membrane for selectively pervaporating alcohol from an alcohol and gasoline mixture. The asymmetric composite membrane includes: a porous substrate having opposite first and second major surfaces, and a plurality of pores; and a pore-filling polymer disposed in at least some of the pores so as to form a layer having a thickness within the porous substrate, with the amount of the polymer at or adjacent to the first major surface being greater than the amount of the polymer at or adjacent to the second major surface, wherein the polymer is more permeable to alcohol than gasoline but not soluble in alcohol or gasoline.

Such membranes may be included in a cartridge, which may be part of a system such as a flex-fuel engine.

The present disclosure also provides methods. For example, the present disclosure provides a method of separating a first liquid (e.g., ethanol) from a mixture of the first liquid (e.g., ethanol) and a second liquid (e.g., gasoline), the method comprising contacting the mixture with a composite membrane (preferably, an asymmetric composite membrane) as described herein.

The terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to claims of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each

DETAILED DESCRIPTION OF ILLUSTRATIVE EMBODIMENTS

Figure 1:
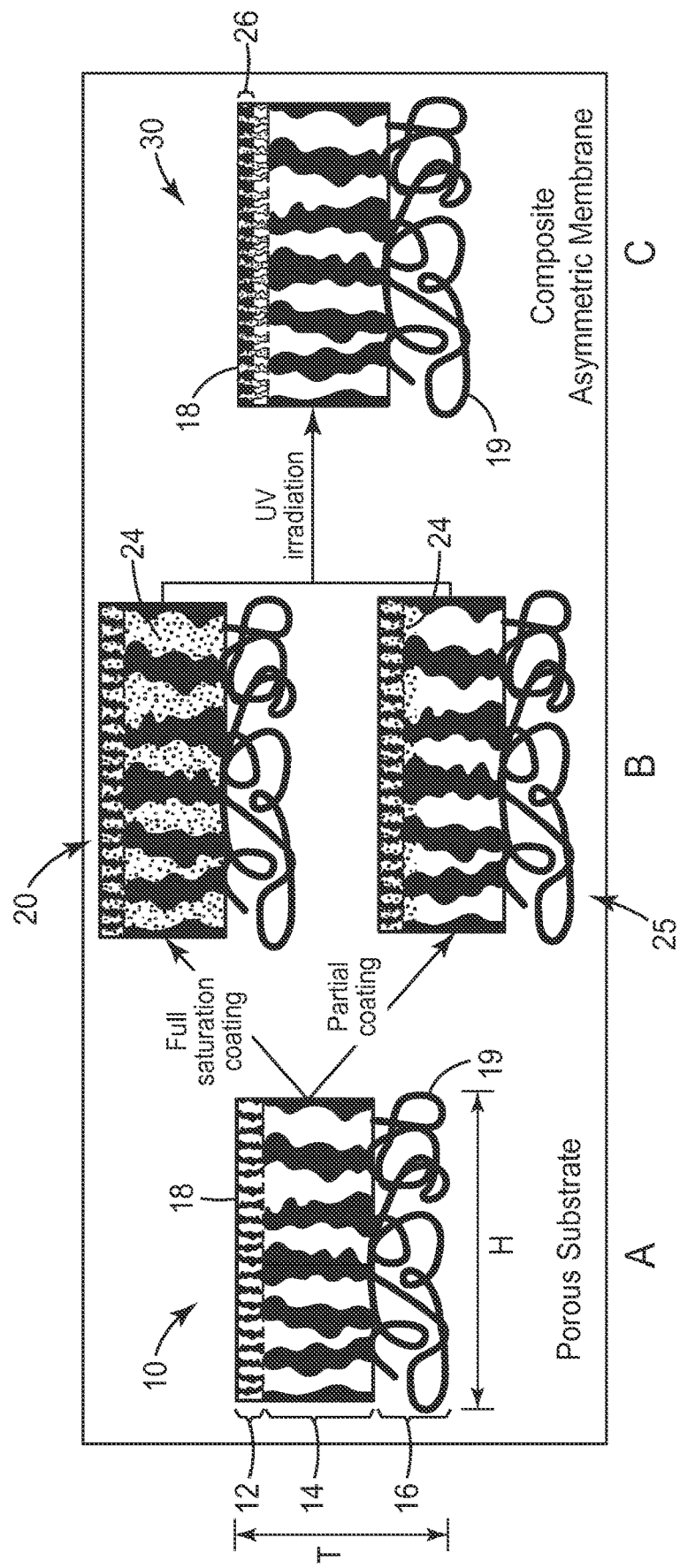
FIG. 1 is a cross-sectional schematic view of an exemplary porous substrate 10 and an asymmetric composite membrane 30 of the present disclosure.

The present disclosure provides composite membranes (preferably, asymmetric composite membranes) that include a porous substrate and a pore-filling polymer. The porous substrate has opposite first and second major surfaces, and a plurality of pores. The pore-filling polymer is disposed in at least some of the pores.

In certain embodiments in which the composite membranes are asymmetric composite membranes the amount of the pore-filling polymer at or adjacent to the first major surface is greater than the amount of the pore-filling polymer at or adjacent to the second major surface. Hence, a composite membrane is an asymmetric with respect to the amount of pore-filling polymer throughout the thickness of the porous substrate.

Such composite membranes may be used in various separation methods, including pervaporation, gas separation, vapor permeation, and organic solvent nanofiltration. The preferred asymmetric composite membranes of the present disclosure are particularly useful in pervaporation methods.

Pervaporation is a process that involves a membrane in contact with a liquid on the feed or upstream side and a vapor on the "permeate" or downstream side. Usually, a vacuum and/or an inert gas is applied on the vapor side of the membrane to provide a driving force for the process. Typically, the downstream pressure is lower than the saturation pressure of the permeate.

Vapor permeation is quite similar to pervaporation, except that a vapor is contacted on the feed side of the membrane instead of a liquid. As membranes suitable for pervaporation separations are typically also suitable for vapor permeation separations, use of the term "pervaporation" may encompass both "pervaporation" and "vapor permeation."

Pervaporation may be used for desulfurization of gasoline, dehydration of organic solvents, isolation of aroma compounds or components, and removal of volatile organic compounds from aqueous solutions. In certain embodiments of the present disclosure, the asymmetric composite membranes are used for pervaporating alcohol from an alcohol and gasoline mixture.

There is a need for highly selective membranes. Traditional composite membranes include a selective thin polymer coating supported on an underlying porous support. Such selective layers will absorb one or more components in a mixture to be separated, which causes their swelling. The swelling will not only decrease mechanical strength but also affect membrane performance. Introduction of chemical crosslinking density or impermeable physical regions could restrain the material swelling to some extent, but this may reduce the permeability. Thus, there is a challenge to create a membrane with effective pervaporation performance and mechanical strength. Also, it is challenging to apply a very thin coating without causing defects or pinholes. One or more composite membranes of the present disclosure have solved one or more of these problems and provide an appropriate balance of properties.

Generally, the composite membranes of the present disclosure include a porous substrate (i.e., a support substrate which may be in the form of one or more porous layers) that includes opposite first and second major surfaces, and a plurality of pores; and a pore-filling polymer disposed in at least some of the plurality of pores so as to form a layer having a thickness within the porous substrate. In certain embodiments, the pore-filling polymer layer is preferably a continuous layer. The amount of the polymer at or adjacent to the first major surface is greater than the amount of the polymer at or adjacent to the second major surface in an asymmetric composite membrane.

Referring to FIG. 1, illustrations of an exemplary porous substrate 10 (FIG. 1A) and an exemplary asymmetric composite membrane 30 (FIG. 1C), with intermediates 20 and 25 (FIG. 1B), are shown in vertical cross-section. The exemplary porous substrate 10 includes three layers that include a nanopororous layer 12, a microporous layer 14, and a macroporous layer 16 (FIG. 1A) having a first major surface 18 and a second major surface 19. During processing, various intermediates could be formed. Two examples of intermediates are shown as 20 and 25 in FIG. 1B. The porous substrate 10 may be fully saturated with a curable pore-filling polymer composition 24 to create intermediate 20 (top panel of FIG. 1B), or the porous substrate 10 may be only partially filled with a curable pore-filling polymer composition 24 to create intermediate 25 (bottom panel of FIG. 1B). That is, the curable pore-filling polymer composition 24 may be disposed in at least some of the plurality of pores. Once the curable (i.e., polymerizable and/or cross-linkable) pore-filling polymer composition 24 is exposed to a radiation source, such as an ultraviolet radiation source, and cured (i.e., polymerized and/or crosslinked), and the uncured pore-filling polymer composition washed away (if there is any), a pore-filling polymer layer 26 is formed. That is, whether the porous substrate is initially fully saturated with (as in intermediate 20), or only partially filled with (as in intermediate 25), the pore-filling polymer, upon being cured and the uncured portion washed away, forms a polymer layer 26. In certain embodiments, this polymer layer 26 has a thickness and is formed within the porous substrate 10, such that the amount of the polymer at or adjacent to the first major surface 18 is greater than the amount of the polymer at or adjacent to the second major surface 19, thereby forming an exemplary asymmetric composite membrane 30 of the present disclosure (FIG. 1C).

In a porous substrate 10, the pores are interconnected vertically (i.e., throughout the thickness "T" of the porous substrate 10, see FIG. 1A). In certain preferred embodiments, the pores of the porous substrate 10 are interconnected horizontally (e.g., as in a microfiltration membrane) along dimension "H" (see FIG. 1A). In such embodiments, the pore-filling polymer layer 26 (FIG. 1C) formed by the pore-filling polymer 24 is preferably a continuous layer. If the pores of the porous substrate 10 are not all interconnected horizontally (along dimension "H"), the layer 26 is discontinuous (i.e., the pore-filling polymer forms a plurality of discreet regions within the porous substrate). It will be understood that dimension "H" generally refers to the plane of the porous substrate and is exemplary of all the various horizontal dimensions within a horizontal slice of the substrate (shown in vertical cross-section). Whether layer 26 is continuous or discontinuous, for the asymmetric composite membrane, the amount of the pore-filling polymer at or adjacent to the first major surface 18 is greater than the amount of the polymer at or adjacent to the second major surface 19.

Figure 12:
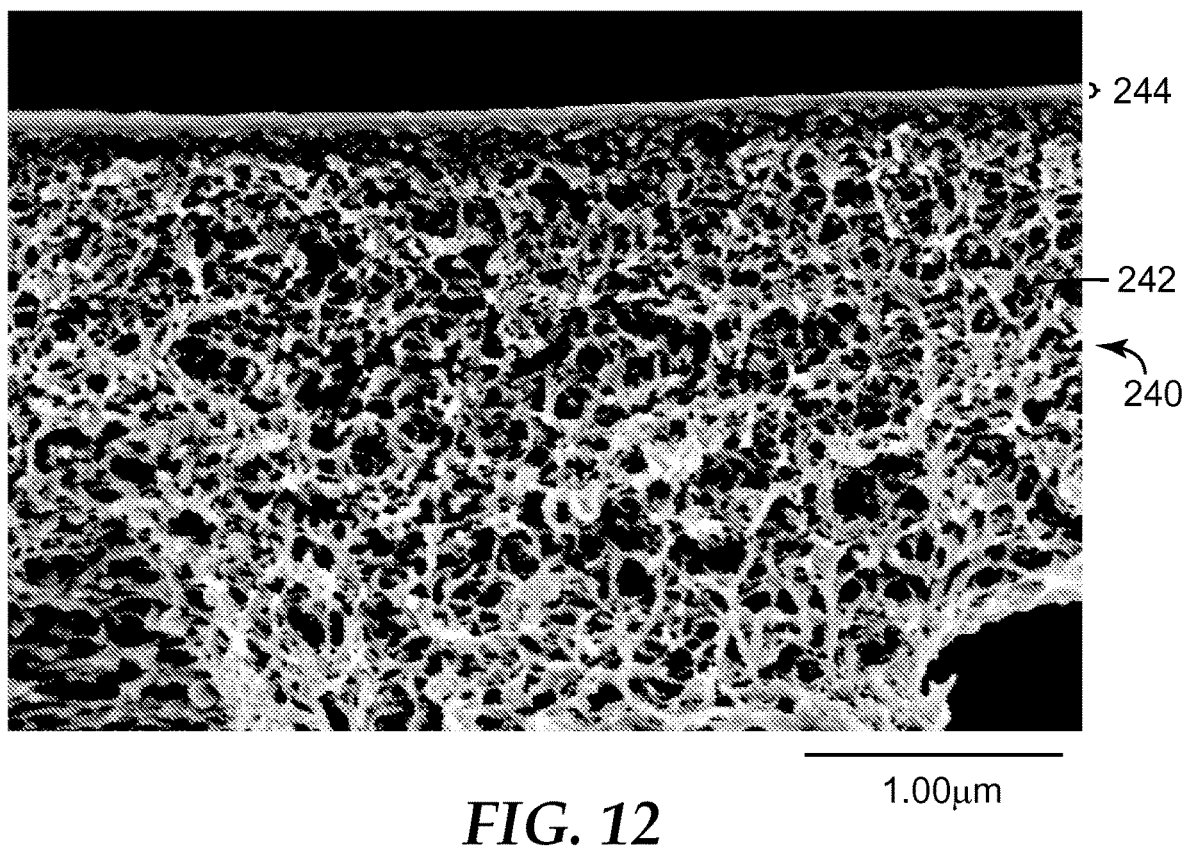
FIG. 12 shows a cross-sectional image of an asymmetric composite membrane of the present disclosure prepared according to Example 23.

As a specific example, reference is to FIG. 12, which shows a cross-sectional image of an asymmetric composite membrane 240 of the present disclosure prepared according to Example 23. In this embodiment, the asymmetric composite membrane 240 includes one layer of a nanoporous substrate 242. The pore-filling polymer is shown in a continuous layer 244.

As used herein, a continuous layer refers to a substantially continuous layer as well as a layer that is completely continuous. A substantially continuous layer is a layer that is continuous enough that the asymmetric composite membrane is able to selectively pervaporate a desired amount of the first liquid (e.g., alcohol) from a mixture of the first liquid with a second liquid (e.g., gasoline). In particular, the flux and the selectivity of the composite membrane (with a "continuous layer" of pore-filling polymer) is sufficient for the particular system in which the membrane is used.

Such membranes are particularly useful for selectively pervaporating a first liquid from a mixture that includes the first liquid and a second liquid, generally because the pore-filling polymer is more permeable to the first liquid than the second liquid. Furthermore, the pore-filing polymer is not soluble in the first liquid or the second liquid.

In certain embodiments, the first liquid may be water, an alcohol (such as ethanol, methanol, 1-propanol, 2-propanol, 1-methoxy-2-propanol, or butanol), or an organic sulfur-containing compound (such as thiophene, tetrahydrothiophene, benzothiophene, 2-methylthiophene, or 2,5-dimethylthiophene).

In certain embodiments, the second liquid may be gasoline, benzene, an ester (such as methyl-tert-butylether, ethyl-tert-butylether), or hexane, cyclohexane.

In certain embodiments, the first liquid is an alcohol, and the second liquid is gasoline. Thus, in one embodiment of the present disclosure, an asymmetric composite membrane for selectively pervaporating alcohol from an alcohol and gasoline mixture is provided. This asymmetric composite membrane includes: a porous substrate having opposite first and second major surfaces, and a plurality of pores; and a pore-filling polymer disposed in at least some of the pores so as to form a continuous layer having a thickness, with the amount of the polymer at or adjacent to the first major surface being greater than the amount of the pore-filling polymer at or adjacent to the second major surface, wherein the polymer is more permeable to alcohol than gasoline but not soluble in alcohol or gasoline.

Porous Substrate

The porous substrate itself may be asymmetric or symmetric. The porous substrate may include one layer or multiple layers. For example, there may be two, three, four, or more layers. In some embodiments, the porous substrate is hydrophobic. In other embodiments, the porous substrate is hydrophilic.

If the porous substrate is asymmetric (before being combined with the pore-filling polymer), the first and second major surfaces have porous structures with different pore morphologies. For example, the porous substrate may have pores of differing sizes throughout its thickness. Analogously, if the porous substrate is symmetric (before being combined with the pore-filling polymer), the major surfaces have porous structures wherein their pore morphologies are the same. For example, the porous substrate may have pores of the same size throughout its thickness.

Referring to FIG. 1A, an asymmetric substrate is shown with different pore morphologies at the first major surface 18 and the second major surface 19. More specifically, there are three layers each of different pore size such that the overall substrate has pores of differing sizes throughout its thickness "T." In certain embodiments, nanoporous layer 12 alone could function as the porous substrate. In such embodiments, the porous substrate would be symmetric.

Suitable porous substrates include, for example, films, porous membranes, woven webs, nonwoven webs, hollow fibers, and the like. For example, the porous substrates may be made of one or more layers that include films, porous films, micro-filtration membranes, ultrafiltration membranes, nanofiltration membranes, woven materials, and nonwoven materials. The materials that may be used for each of the above-mentioned supports may be organic in nature (such as the organic polymers listed below), inorganic in nature (such as aluminum, steels, and sintered metals and or ceramics and glasses), or a combination thereof. For example, the porous substrate may be formed from polymeric materials, ceramic and glass materials, metal, and the like, or combinations (i.e., mixtures and copolymers) thereof.

In composite membranes of the present disclosure, materials that withstand hot gasoline environment and provide sufficient mechanical strength to the composite membranes are preferred. Materials having good adhesion to each other are particularly desirable. In certain embodiments, the porous substrate is preferably a polymeric porous substrate.

Suitable polymeric materials include, for example, polystyrene, polyolefins, polyisoprenes, polybutadienes, fluorinated polymers (e.g., polyvinylidine difluoride (PVDF), ethylene-co-chlorotrifluoroethylene copolymer (ECTFE), polytetrafluoroethylene (PTFE)), polyvinyl chlorides, polyesters, polyamides (e.g., various nylons), polyimides, polyethers, poly(ether sulfone)s, poly(sulfone)s, poly(phenylene sulfone)s, polyphenylene oxides, polyphenylene sulfides (PPS), poly(vinyl acetate)s, copolymers of vinyl acetate, poly(phosphazene)s, poly(vinyl ester)s, poly(vinyl ether)s, poly(vinyl alcohol)s, polycarbonates, polyacrylonitrile, polyethylene terephthalate, cellulose and its derivatives (such as cellulose acetate and cellulose nitrate), and the like, or combinations (i.e., mixtures or copolymers) thereof.

Suitable polyolefins include, for example, poly(ethylene), poly (propylene), poly(1-butene), copolymers of ethylene and propylene, alpha olefin copolymers (such as copolymers of 1-butene, 1-hexene, 1-octene, and 1-decene), poly(ethylene-co-1-butene), poly(ethylene-co-1-butene-co-1-hexene), and the like, or combinations (i.e., mixtures or copolymers) thereof.

Suitable fluorinated polymers include, for example, polyvinylidine difluoride (PVDF), poly(vinyl fluoride), poly (vinylidene fluoride), copolymers of vinylidene fluoride (such as poly(vinylidene fluoride-co-hexafluoropropylene)), copolymers of chlorotrifluoroethylene (such as ethylene-co-chlorotrifluoroethylene copolymer), polytetrafluoroethylene, and the like, or combinations (i.e., mixtures or copolymers) thereof.

Suitable polyamides include, for example, poly(imino(1-oxohexamethylene)), poly(iminoadipoylimino hexamethylene), poly(imnminoadipoyliminodecamethylene), polycaprolactam, and the like, or combinations thereof.

Suitable polyimides include, for example, poly(pyromellitimide), polyetherimide and the like.

Suitable poly(ether sulfone)s include, for example, poly (diphenylether sulfone), poly(diphenylsulfone-co-diphenylene oxide sulfone), and the like, or combinations thereof.

Suitable polyethers include, for example, polyetherether ketone (PEEK).

Such materials may be photosensitive or non-photosensitive. Photosensitive porous substrate materials may act as a photoinitiator and generate radicals which initiate polymerization under radiation sources, such as UV radiation, so that the filled polymer could covalently bond to the porous substrate. Thus, crosslinking within the pore-filling polymer is not necessary to strongly hold the filled polymer to the substrate, since this could result in the polymer being bonded or tethered to the substrate walls. Suitable photosensitive materials include, for example, polysulfone, polyethersulfone, polyphenylenesulfone, PEEK, polyimide, and PPS. Photosensitive materials are preferably used for nanoporous layers.

Suitable porous substrates may have pores of a wide variety of sizes. For example, suitable porous substrates may include nanoporous membranes, microporous membranes, microporous nonwoven/woven webs, microporous woven webs, microporous fibers, nanofiber webs and the like. In some embodiments, the porous substrate may have a combination of different pore sizes (e.g., micropores, nanopores, and the like). In one embodiment, the porous substrate is microporous.

In some embodiments, the porous substrate includes pores that may have an average pore size less than 10 micrometers (μm). In other embodiments, the average pore size of the porous substrate may be less than 5 μm, or less than 2 μm, or less than 1 μm.

In other embodiments, the average pore size of the porous substrate may be greater than 10 nm (nanometer). In some embodiments, the average pore size of the porous substrate is greater than 50 nm, or greater than 100 nm, or greater than 200 nm.

In certain embodiments, the porous substrate includes pores having an average size in the range of from 0.5 nm up to and including 1000 μm. In some embodiments, the porous substrate may have an average pore size in a range of 10 nm to 10 μm, or in a range of 50 nm to 5 μm, or in a range of 100 nm to 2 μm, or in a range of 200 nm to 1 μm.

In certain embodiments, the porous substrate includes a nanoporous layer. In certain embodiments, the nanoporous layer is adjacent to or defines the first major surface of the porous substrate. In certain embodiments, the nanoporous layer includes pores having a size in the range of from 0.5 nanometer (nm) up to and including 100 nm. In accordance with the present disclosure, the size of the pores in the nanoporous layer may include, in increments of 1 nm, any range between 0.5 nm and 100 nm. For example, the size of the pores in the nanoporous layer may be in the range of from 0.5 nm to 50 nm, or 1 nm to 25 nm, or 2 nm to 10 nm, etc. Molecular Weight Cut-Off (MWCO) is typically used to correlate to the pore size. That is, for nanopores, the molecular weight of a polymer standard (retain over 90%) such as dextran, polyethylene glycol, polyvinyl alcohol, proteins, polystyrene, poly(methylmethacrylate) may be used to characterize the pore size. For example, one supplier of the porous substrates evaluates the pore sizes using a standard test, such as ASTM E1343-90-2001 using polyvinyl alcohol.

In certain embodiments, the porous substrate includes a microporous layer. In certain embodiments, the microporous layer is adjacent to or defines the first major surface of the porous substrate. In certain embodiments, the microporous layer includes pores having a size in the range of from 0.01 μm up to and including 20 μm. In accordance with the present disclosure, the size of the pores in the microporous layer may include, in increments of 0.05 μm, any range between 0.01 μm up and 20 μm. For example, the size of the pores in the microporous layer may be in the range of from 0.05 μm to 10 μm, or 0.1 μm to 5 μm, or 0.2 μm to 1 μm, etc. Typically, the pores in the microporous layer may be measured by mercury porosimetry for average or largest pore size, bubble point pore size measurement for the largest pores, Scanning Electron Microscopy (SEM) and/or Atom Force Microscopy (AFM) for the average/largest pore size.

In certain embodiments, the porous substrate includes a macroporous layer. In certain embodiments, the macroporous layer is adjacent to or defines the first major surface of the porous substrate. In certain embodiments, the macroporous layer is embedded between two microporous layers, for example a BLA020 membrane obtained from 3M Purification Inc.

In certain embodiments, the macroporous layer comprises pores having a size in the range of from 1 μm and 1000 μm. In accordance with the present disclosure, the size of the pores in the macroporous layer may include, in increments of 1 μm, any range between 1 μm up to and including 1000 μm. For example, the size of the pores in the macroporous substrate may be in the range of from 1 μm to 500 μm, or 5 μm to 300 μm, or 10 μm to 100 μm, etc. Typically, the size of the pores in the macroporous layer may be measured by Scanning Electron Microscopy, or Optical Microscopy, or using a Pore Size Meter for Nonwovens.

The macroporous layer is typically preferred at least because the macropores not only provide less vapor transport resistance, compared to microporous or nanoporous structures, but the macroporous layer can also provide additional rigidity and mechanical strength.

The thickness of the porous substrate selected may depend on the intended application of the membrane. Generally, the thickness of the porous substrate ("T" in FIG. 1A) may be greater than 10 micrometers (μm). In some embodiments, the thickness of the porous substrate may be greater than 1,000 μm, or greater than 5,000 μm. The maximum thickness depends on the intended use, but may often be less than or equal to 10,000 μm.

In certain embodiments, the porous substrate has first and second opposite major surfaces, and a thickness measured from one to the other of the opposite major surfaces in the range of from 5 µm up to and including 500 µm. In accordance with the present disclosure, the thickness of the porous substrate may include, in increments of 25 µm, any range between 5 µm and 500 µm. For example, the thickness of the porous substrate may be in the range of from 50 µm to 400 µm, or 100 µm to 300 µm, or 150 µm to 250 µm, etc.

In certain embodiments, the nanoporous layer has a thickness in the range of from 0.01 µm up to and including 10 µm. In accordance with the present disclosure, the thickness of the nanoporous layer may include, in increments of 50 nm, any range between 0.01 µm and 10 µm. For example, the thickness of the nanoporous layer may be in the range of from 50 nm to 5000 nm, or 100 nm to 3000 nm, or 500 nm to 2000 nm, etc.

In certain embodiments, the microporous layer has a thickness in the range of from 5 µm up to and including 300 µm. In accordance with the present disclosure, the thickness of the microporous layer may include, in increments of 5 µm, any range between 5 µm and 300 µm. For example, the thickness of the microporous layer may be in the range of from 5 µm to 200 µm, or 10 µm to 200 µm, or 20 µm to 100 µm, etc.

In certain embodiments, the macroporous layer has a thickness in the range of from 25 µm up to and including 500 µm. In accordance with the present disclosure, the thickness of the macroporous layer may include, in increments of 25 µm, any range between 25 µm up and 500 µm. For example, the thickness of the macroporous substrate may be in the range of from 25 µm to 300 µm, or 25 µm to 200 µm, or 50 µm to 150 µm, etc.

In certain embodiments, there may be anywhere from one to four layers in any combination within a porous substrate. The individual thickness of each layer may range from 5 nm to 1500 µm in thickness.

In certain embodiments, each layer may have a porosity that ranges from 0.5% up to and including 95%.

Pore-Filling Polymer

In general, the pore-filling polymer is insoluble in the liquids in which it comes into contact during use. More specifically, the pore-filling polymer is more permeable to a first liquid than a second liquid, but it is not soluble in the first liquid or the second liquid. As used herein, the polymer is considered to be insoluble in the first liquid (particularly, alcohol) or the second liquid (particularly, gasoline), even if insignificant amounts of the polymer are soluble in the liquids.

In certain embodiments, the pore-filling polymer is in the form of a pore-filling polymer layer 26 (FIG. 1C) that forms at least a portion of the first major surface 18 of the porous substrate. In certain embodiments, the pore-filling polymer is in the form of a pore-filling polymer layer having an exposed major surface, which coats the first major surface of the porous substrate, and an opposite major surface disposed between the opposite first and second major surfaces of the porous substrate. In certain embodiments, the exposed major surface of the pore-filling polymer layer coats all the first major surface of the porous substrate.

In certain embodiments, the pore-filling polymer forms a coating on (i.e., covers) the top surface of the substrate in addition to being within the pores of the substrate. This coating layer may be 1 micron thick. This top coating layer may be continuous or discontinuous.

That is, as used herein, any reference to the pore-filling polymer layer coating or covering the first major surface of the porous substrate includes the pore-filling polymer layer coating all, substantially all, or only a portion of the first major surface of the porous substrate. The pore-filling polymer layer is considered to coat substantially all of the first major surface of the porous substrate (i.e., be substantially continuous), when enough of the first major surface of the porous substrate is coated such that the composite membrane is able to selectively pervaporate a desired amount of a first liquid (e.g., alcohol) from a mixture of the first liquid with a second liquid (e.g., gasoline).

In certain embodiments, the pore-filling polymer layer has a thickness in the range of from 10 nm up to and including 20,000 nm. More specifically, the thickness of the pore-filling polymer layer may include, in increments of 1 nm, any range between 10 nm and 20,000 nm. For example, the thickness of the pore-filling polymer layer may be in the range of from 11 nm to 5999 nm, or 20 nm to 6000 nm, or 50 nm to 5000 nm, etc.

The pore-filling polymer may be crosslinked. It may be grafted to the porous (substrate) membrane (e.g., which may be in the form of a nanoporous layer). Or, it may be crosslinked and grafted to the porous substrate (e.g., nanoporous layer).

In certain embodiments, the pore-filling polymer may swell in the presence of alcohol (e.g., ethanol) but not gasoline. When the pore-filling polymer swells in the presence of the alcohol, the resultant alcohol-swollen polymer may be referred to as a gel.

In certain embodiments, the starting materials for the pore-filling polymer include polymerizable materials such as ethylenically unsaturated monomers and/or oligomers.

In certain embodiments, the starting materials for the pore-filling polymer include (meth)acrylate-containing monomers and/or oligomers. Suitable (meth)acrylate-containing monomers and/or oligomers may be selected from the group of a polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H,6H,6H-perfluorohydroxyldiacrylate, a urethane diacrylate, a urethane hexa-acrylate, a urethane triacrylate, a polymeric tetrafunctional acrylate, a polyester penta-acrylate, an epoxy diacrylate, a polyester triacrylate, a polyester tetra-acrylate, an amine-modified polyester triacrylate, an alkoxylated aliphatic diacrylate, an ethoxylated bisphenol di(meth)acrylate, a propoxylated triacrylate, and 2-acrylamido-2-methylpropanefulfonic acid (AMPS). Various combinations of such monomers and/or oligomers may be used to form the pore-filling polymer.

In certain embodiments, the (meth)acrylate-containing monomers and/or oligomers may be selected from the group of a polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H,6H,6H-perfluorohydroxyldiacrylate, and a polyester tetra-acrylate. Various combinations of such monomers and/or oligomers may be used to form the pore-filling polymer.

In certain embodiments, the starting monomers and/or oligomers include one or more of the following:
(a) di(meth)acryl-containing compounds such as dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, and tripropylene glycol diacrylate;

(b) tri(meth)acryl-containing compounds such as trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), and trimethylolpropane triacrylate;

(c) higher functionality (meth)acryl-containing compounds (i.e., higher than tri-functional) such as ditrimethylolpropane tetraacrylate, dipentaerythritol pentaacrylate, ethoxylated (4) pentaerythritol tetraacrylate, pentaerythritol tetraacrylate, and caprolactone modified dipentaerythritol hexaacrylate;

(d) oligomeric (meth)acryl compounds such as, for example, urethane acrylates, polyester acrylates, epoxy acrylates, silicone acrylates, polyacrylamide analogues of the foregoing, and combinations thereof (such compounds are widely available from vendors such as, for example, Sartomer Company, Exton, Pa., UCB Chemicals Corporation, Smyrna, Ga., and Aldrich Chemical Company, Milwaukee, Wis.);

(e) perfluoroalkyl meth(acryl)-containing compounds such as 1H,1H,6H,6H-perfluorohydroxyldiacrylate, 1H,1H-2,2,3,3,4,4,4-heptafluorobutyl acrylate, and perfluorocyclohexyl) methyl acrylate;

(f) charged meth(acryl)-containing compounds such as acrylic acid, 2-acrylamido-2-methylpropanefulfonic acid (AMPS), and [3-(Methacryloylamino)propyl]trimethylammonium chloride solution; and (g) polar meth(acryl)-containing compounds such as 2-hydroxyethyl(meth)acrylate (HEMA), N-vinyl acetamide, N-vinyl pyrrolidone, (meth)acrylamide, and glycerol methacrylate.

In certain embodiments, the pore-filling polymer is a polyethylene glycol (PEG) polymer or copolymer.

In certain embodiments, the pore-filling polymer includes a major amount of crosslinked multifunctional (meth)acrylate. For example, an asymmetric composite membrane of the present disclosure may include: a porous substrate having opposite first and second major surfaces, and a plurality of pores; and a pore-filling polymer disposed in at least some of the pores so as to form a continuous layer having a thickness, with the amount of the pore-filling polymer at or adjacent to the first major surface being greater than the amount of the pore-filling polymer at or adjacent to the second major surface, wherein the pore-filling polymer comprises a major amount of crosslinked multifunctional (meth)acrylate.

In certain embodiments, the pore-filling polymer may include additives such as polymeric additives, particulate, photoinitiators, or combinations thereof.

In some embodiments, the pore-filling polymer may include one or more polymeric additives (i.e., an additive that is a polymer and not further polymerizable). Examples of such polymeric additives include polyacrylic acid, polymethacrylic acid, polyacrylamide or its copolymers, polyethylene oxide, polyvinyl alcohol, poly(ethylene-co-vinyl alcohol) (EVAL), poly(N-vinylpyrrolidone), and combinations thereof (i.e., mixtures or copolymers thereof). The optional polymeric additive preferably has a strong affinity with the pore-filling polymer so that the latter is reinforced by the former. A polymeric additive preferably enter pores with the polymerizable starting materials thereby forming an interpenetrating polymer network. The swelling of the pore-filling polymer is believed to be further restrained by the formation of such interpenetrating polymer network (one polymer is intertwined with another polymer network on a polymeric scale). The molecular weight (weight average) of the polymeric additive typically varies from 1,000 to 500,000. The amount of polymeric additive may be at least 0.20 wt-%, or at least 1%, or at least 2.5%, based on the total amount of pore-filling polymer plus polymeric additive. The amount of polymeric additive may be up to 5 wt-%, or up to 25%, or up to 75%, based on the total amount of pore-filling polymer plus polymeric additive.

In some embodiments, the pore-filling polymer may include a particulate or a plurality of particulates. Examples of suitable particulates include colloidal silica, colloidal titania, colloidal zirconia, colloidal alumina, colloidal vanadia, colloidal chromia, colloidal iron oxide, colloidal antimony oxide, colloidal tin oxide, and mixtures thereof. In certain embodiments, such particulates may have a particle size of 2 nm to 50 nm. They may be used as bridges to prevent collapse of the filled polymer and/or be selective for particular liquids (e.g., ethanol).

Other optional additives that may be included in the pore-filling polymers include photoinitiators. Exemplary photoinitiators for initiating free-radical polymerization of (meth)acrylates, for example, include benzoin and its derivatives such as alpha-methylbenzoin; alpha-phenylbenzoin; alpha-allylbenzoin; alpha-benzylbenzoin; benzoin ethers such as benzil dimethyl ketal (available, for example, under the trade designation IRGACURE 651 from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (available, for example, under the trade designation DAROCUR 1173 from Ciba Specialty Chemicals) and 1-hydroxycyclohexyl phenyl ketone (available, for example, under the trade designation IRGACURE 184 from Ciba Specialty Chemicals); 2-methyl-1-[4-(methylthio)phenyl]-2-(4-morpholinyl)-1-propanone (available, for example, under the trade designation IRGACURE 907 from Ciba Specialty Chemicals); 2-benzyl-2-(dimethlamino)-1-[4-(4-morpholinyl)phenyl]-I-butanone (available, for example, as IRGACURE 369 from Ciba Specialty Chemicals). Other useful photoinitiators include pivaloin ethyl ether, anisoin ethyl ether; anthraquinones, such as anthraquinone, 2-ethylanthraquinone, l-chloroanthraquinone, 1,4-dimethyl anthraquinone, 1-methoxyanthraquinone, benzanthraquinonehalomethyltriazines; benzophenone and its derivatives; iodonium salts and sulfonium salts; titanium complexes such as bis(eta$_5$-2,4-cyclopentadien-1-yl)bis[2,6-difluoro-3-(1H-pyrrol-1-yl)phenyl]titanium (obtained under the trade designation CGI 784 4-bromomethylnitrobenzene; mono- and bis-acylphosphines (available, for example, from Ciba Specialty Chemicals as IRGACURE 1700, IRGACURE 1800, IRGACURE 1850, and DAROCUR 4265).

Methods of Making Composite Membrane

Well-known techniques may be used to make the asymmetric composite membranes of the present disclosure.

Typically, a curable pore-filling polymer composition (i.e., "pore-filling polymer coating solution" or simply "pore-filling coating solution") may be prepared by one or more monomers and/or oligomers with optional additives in a suitable amount of a liquid (e.g., deionized water or organic solvents). If an organic solvent is used may include debutyl sebecate, glycerol triacetate, methanol, ethanol, propanol, isopropanol, etc.). Preferably, it is a volatile organic solvent for easy solution saturation or diffusion into the pores.

The pore-filling coating solution may be applied to a selected porous substrate by a variety of techniques such as dip coating, gravure coating, die coating, slot coating, etc. Monomer and/or oligomer concentration may range from 0.5% to 100%. Monomer with polar groups or charged groups such as 2-acrylamido-2-methylpropanesulfonic acid (AMPS) may be added into the coating solution to increase ethanol selectivity.

For example, a porous substrate may be saturated in a pore-filling coating solution of monomers and/or oligomers of a pore-filling polymer (e.g., a polyethylene glycol diacrylate, etc.) in deionized water. Typically, the substrate may be separated from the liquid (e.g., volatile organic solvent) before or after irradiation. Preferably, upon removal from the solution, the substrate may be exposed to irradiation, such as UV irradiation. This can be done for example, on a moving belt. Any uncured pore-filling coating solution may be washed away, and then the composite membrane dried.

Commercially available porous substrates may be supplied with a humectant, such as glycerol, that fills and/or coats the pores of the substrate. Typically, this is done to prevent small pores from collapsing during drying process and storage, for example. This humectant may or may not be washed out before using. Typically, however, the humectant is washed out by the process of filling the pores with the pore-filling coating solution.

Suitable methods for preparing preferred asymmetric composite membranes of the present disclosure are described in International Publication No. WO 2010/002501 (Zhou et al.).

Uses

Composite membranes, particularly asymmetric composite membranes, of the present disclosure may be used in various separation methods, including pervaporation, vapor permeation, gas separation, nanofiltration and organic solvent nanofiltration. The composite membranes, particularly the asymmetric composite membranes, of the present disclosure are particularly useful in pervaporation methods. Pervaporation may be used for desulfurization of gasoline, dehydration of organic solvents, isolation of aroma components, and removal of volatile organic compounds from aqueous solutions.

Preferred methods of the present disclosure involve use of the composite membranes, particularly the asymmetric composite membranes, in pervaporation, particularly pervaporating alcohol from an alcohol and gasoline mixture.

Well-known separation techniques may be used with the composite membranes of the present disclosure. For example, nanofiltration techniques are described in U.S. Pat. Pub. No. 2013/0118983 (Linvingston et al.), U.S. Pat. No. 7,247,370 (Childs et al.), and U.S. Pat. Pub. No. 2002/0161066 (Remigy et al.). Pervaporation techniques are described in U.S. Pat. No. 7,604,746 (Childs et al.) and EP 0811420 (Apostel et al.). Gas separation techniques are described in *Journal of Membrane Sciences*, vol. 186, pages 97-107 (2001).

Pervaporation separation rate is typically not constant during a depletion separation. The pervaporation rate is higher when the feed concentration of the selected material (in this case ethanol) is higher than near then end of the separation when the feed concentration of the selected material is lower and this rate is typically not linear with concentration. At high feed concentration the separation rate is high and the feed concentration of the selected material and flux falls rapidly, but this concentration and flux changes very slowly as the limit of depletion is reached.

Typical conditions used in separation methods of the present disclosure include fuel temperatures of from room temperature up to 95° C., fuel pressures of from 10 pounds per square inch (psi) (69 kPa) to 100 psi (690 kPa), fuel flow rates of 0.1 liter per minute (L/min) to 20 L/min, and vacuum pressures of from 20 Torr (2.67 kPa) to ambient pressure (i.e., 760 Torr (101 kPa)).

The performance of a composite membrane is mainly determined by the properties of the pore-filling polymer anchored within the pores of the porous (support) membrane.

The efficiency of a pervaporation membrane may be expressed as a function of its selectivity and of its specific flux. The selectivity is normally given as the ratio of the concentration of the better permeating component to the concentration of the poorer permeating component in the permeate, divided by the corresponding concentration ratio in the feed mixture to be separated:

$$\alpha=(y_w/y_i)/(x_w/x_i)$$

wherein $y_w$ and $y_i$ are the content of each component in the permeate, and $x_w$ and $x_i$ are the content of each component in the feed, respectively. Sometimes, the permeate concentration is defined as the separation efficiency if the feed component is relatively consistent.

The trans-membrane flux is a function of the composition of the feed. It is usually given as permeate amount per membrane area and per unit time, e.g., kilogram per meter squared per hour ($kg/m^2/hr$).

In certain embodiments of the present disclosure, the pore-filling polymer exhibits an alcohol selectivity in the range of from at least 30% up to and including 100%. In this context, "alcohol selectivity" means the amount of alcohol in the gasoline/alcohol mixture that diffuses through to the output side of the asymmetric composite membrane. In accordance with the present disclosure, the alcohol selectivity of the pore-filling polymer may include, in increments of 1%, any range between 30% and 100%. For example, the alcohol selectivity may be in the range of from 31% up to 99%, or 40% to 100%, or 50% to 95%, etc.

In certain embodiments, the pore-filling polymer in the composite membrane exhibits an average alcohol permeate flux (e.g., from an alcohol/gasoline mixture) in the range of from at least 0.3 $kg/m^2/hr$, and in increments of 10 $g/m^2/hr$, up to and including 30 $kg/m^2/hr$. The average ethanol flux from E10 (10% ethanol) to E2 (2% ethanol) standard include in the range of from 0.2 $kg/m^2/hr$ to 20 $kg/m^2/hr$. Preferred processing conditions used for such flux measurement include: a feed temperature of from 20° C. to 95° C., a permeate vacuum pressure of from 20 Torr (2.67 kPa) to 760 Torr (101 kPa), a feed pressure of from 10 psi (69 kPa) to 100 psi (690 kPa), and an ethanol concentration in feed gasoline of from 2% to 20%.

In certain embodiments of the present disclosure, the pore-filling polymer in the composite membrane can exhibit an average ethanol permeate flux, in increments of 10 $g/m^2/hour$, between the below-listed upper and lower limits (according to Method 1 and/or Method 2 in the Examples Section). In certain embodiments, the average ethanol permeate flux may be at least 310 $g/m^2/hour$, or at least 350 $g/m^2/hour$, or at least 500 $g/m^2/hour$. In certain embodiments, the average permeate flux may be up to 30 $kg/m^2/hour$, or up to 20 $kg/m^2/hour$, or up to 10 $kg/m^2/hour$. For example, the average permeate flux may be in the range of from 310 g/m²/hour up to 20 kg/m²/hour, or 350 g/m²/hour up to 30 kg/m²/hour, or 500 g/m²/hour up to 10 kg/m²/hour, etc. It may be desirable for the pore-filling polymer to exhibit an average permeate flux of 320 g/m²/hour, when the asymmetric composite membrane is assembled into 0.3 to 5 liter volume cartridge such that the cartridge will produce the desired amount of flux to meet the system requirements. The system requirements are defined by internal combustion engines that require ethanol flux. One example is a Japan Society of Automotive Engineers technical paper JSAE 20135048 titled "Research Engine System Making Effective Use of Bio-ethanol-blended Fuels."

Preferred processing conditions used for such flux measurement include: a feed temperature of from 20° C. to 95° C., a permeate vacuum pressure of from 20 Torr (2.67 kPa) to 760 Torr (101 kPa), a feed pressure of from 10 psi (69 kPa) to 100 psi (690 kPa), and an ethanol concentration in feed gasoline of from 2% to 20%.

Composite membranes of the present disclosure may be incorporated into cartridges (i.e., modules), in particular cartridges for separating alcohol from an alcohol and gasoline mixture. Suitable cartridges include, for example, spiral-wound modules, plate and frame modules, tubular modules, hollow fiber modules, pleated cartridge, and the like.

Figure 2:
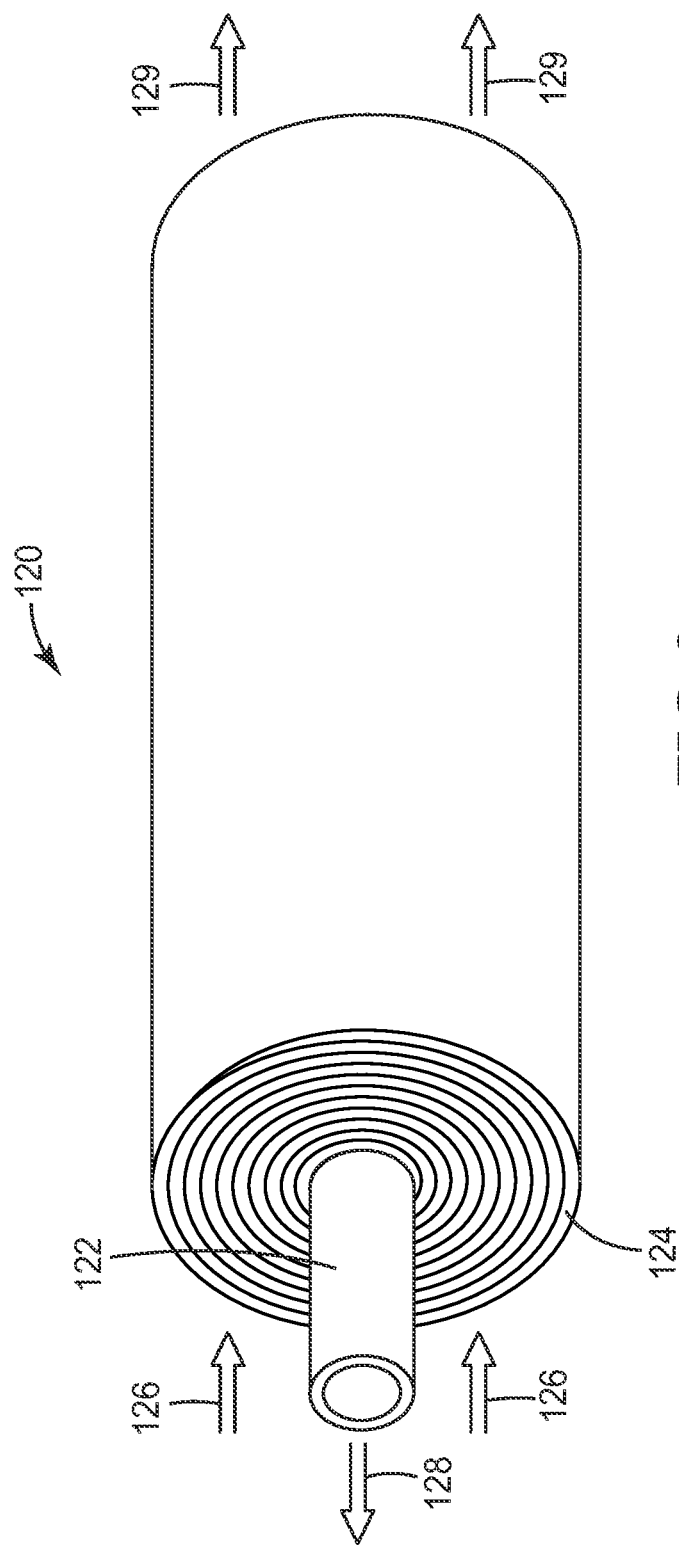
FIG. 2 is a perspective side view of a module that includes an exemplary composite membrane of the present disclosure.

FIG. 2 is an illustration of an exemplary module 120 (specifically, a spiral-wound module) that includes a support tube 122, an exemplary composite membrane 124 of the present disclosure wound onto the support tube 122. During use, a mixture of liquids to be separated (e.g., alcohol and gasoline mixture) enters the module 120 and flows along the direction of arrows 126 into the composite membrane 124. As the mixture flows past the composite membrane layers, the liquid that is less soluble in the pore-filling polymer (e.g., gasoline) is not absorbed by the pore-filling polymer, while the more permeable liquid (e.g., alcohol) is absorbed in and passes through the pore-filling polymer and then flows out of the center of the support tube 122 along the direction of arrow 128. For example, a high concentration of alcohol (typically with a small amount of gasoline), which is separated from an alcohol/gasoline mixture, flows out of the center of the support tube 122 as vapor and/or liquid along the direction of arrow 128, and the resultant mixture with a lower concentration of alcohol than present in the mixture that enters the composite membrane flows out of the composite membrane along the direction of arrows 129.

Figure 3:
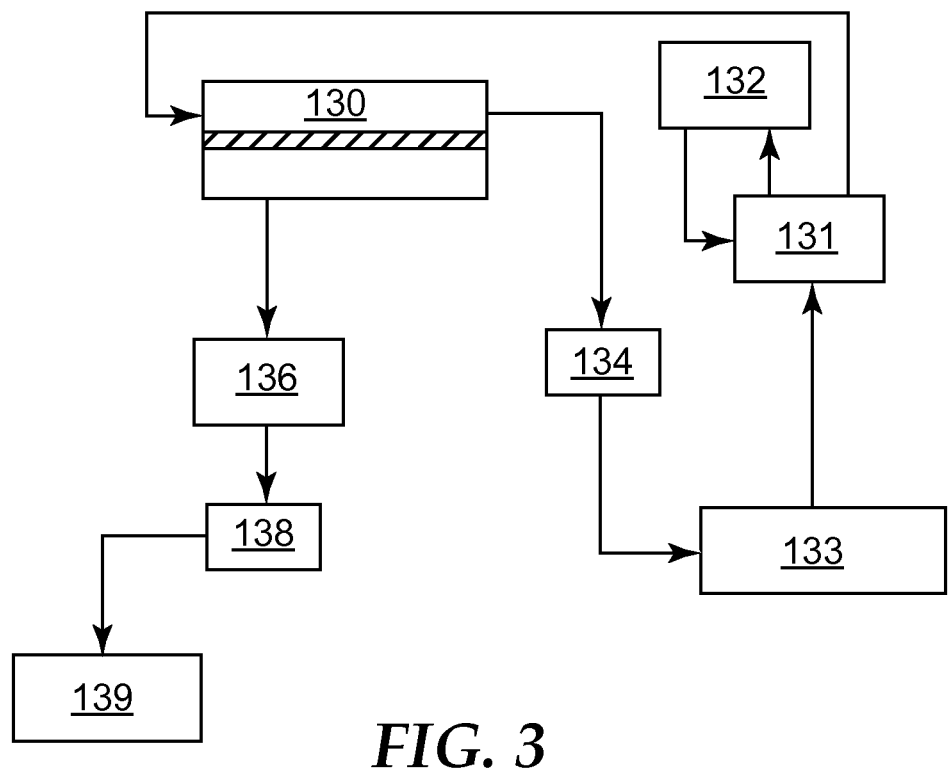
FIG. 3 is an illustration of an exemplary fuel separation system that includes an exemplary composite membrane of the present disclosure.

In certain embodiments, an exemplary cartridge has a volume in the range of from 200 milliliters (mL), or 500 mL, up to and including 5.000 liters (L). In accordance with the present disclosure, the volume of the cartridge may include, in increments of 10 mL, any range between 200 mL, or 500 mL, and 5.000 L. For example, the cartridge volume may be in the range of from 210 mL up to 4.990 L, or 510 mL up to 4.990 L, or 300 mL up to 5.000 L, or 600 mL up to 5.000 L, or 1.000 L up to 3.000 L, etc. In certain embodiments, the cartridge has a volume of 1.000 L. In certain embodiments, the cartridge has a volume of 0.800 L Cartridges that include asymmetric composite membranes of the present disclosure may be incorporated into fuel separation systems, which may be used in, or in conjunction with, engines such as flex-fuel engines. An exemplary fuel separation system is shown in FIG. 3, which employs a membrane pervaporation method (PV method) to separate high ethanol fraction gasoline from gasoline containing ethanol. Typically, gasoline is introduced into an inlet of a membrane separation unit 130 after being passed through a heat exchanger 131 (which is connected to engine coolant 132) from a main fuel storage tank 133. A low-ethanol fraction fuel from the membrane separation unit 130 is returned to the main fuel storage tank 133 after being cooled as it passes through a radiator 134. The ethanol rich vapor which came out of membrane separation unit 130 is typically passed through a condenser 136 where it is condensed under negative pressure produced by vacuum pump 138 and then collected in an ethanol tank 139.

EXEMPLARY EMBODIMENTS

Embodiment 1 is a composite membrane for selectively pervaporating a first liquid from a mixture comprising the first liquid and a second liquid, the asymmetric composite membrane comprising: a porous substrate comprising opposite first and second major surfaces, and a plurality of pores; and a pore-filling polymer disposed in at least some of the pores so as to form a layer having a thickness within the porous substrate; wherein the pore-filling polymer is more permeable to the first liquid than the second liquid but not soluble in the first liquid or the second liquid. The composite membrane may be asymmetric or symmetric with respect to the amount of pore-filling polymer throughout the thickness of the porous substrate.

Embodiment 2 is the composite membrane of embodiment 1 is an asymmetric composite membrane wherein the amount of the pore-filling polymer at or adjacent to the first major surface is greater than the amount of the pore-filling polymer at or adjacent to the second major surface, Embodiment 3 is the composite membrane according to embodiment 1 or 2, wherein the first liquid is an alcohol.

Embodiment 4 is the composite membrane according to any one of embodiments 1 through 3, wherein the second liquid is gasoline, benzene, an ester, or hexane.

Embodiment 5 is the composite membrane according to any one of embodiments 1 through 4, wherein the first liquid is an alcohol, and the second liquid is gasoline.

Embodiment 6 is the composite membrane according to any one of embodiments 1 through 5, wherein the pore-filling polymer layer is a continuous layer.

Embodiment 7 is an asymmetric composite membrane for selectively pervaporating alcohol from an alcohol and gasoline mixture, the asymmetric composite membrane comprising: a porous substrate comprising opposite first and second major surfaces, and a plurality of pores; and a pore-filling polymer disposed in at least some of the pores so as to form a layer having a thickness within the porous substrate, with the amount of the pore-filling polymer at or adjacent to the first major surface being greater than the amount of the pore-filling polymer at or adjacent to the second major surface; wherein the pore-filling polymer is more permeable to alcohol than gasoline but not soluble in alcohol or gasoline.

Embodiment 8 is the asymmetric composite membrane according to embodiment 7, wherein the pore-filling polymer layer is a continuous layer.

Embodiment 9 is the composite membrane according to any one of embodiments 1 through 8, wherein the porous substrate is a polymeric porous substrate.

Embodiment 10 is the composite membrane according to embodiment 9, wherein the porous substrate is asymmetric or symmetric (e.g., with respect to pore sizes throughout the thickness of the substrate).

Embodiment 11 is the composite membrane according to any one of embodiments 1 through 10, wherein the porous substrate comprises a nanoporous layer.

Embodiment 12 is the composite membrane according to embodiment 11, wherein the nanoporous layer is adjacent to or defines the first major surface of the porous substrate.

Embodiment 13 is the composite membrane according to any one of embodiments 1 through 12, wherein the porous substrate comprises a microporous layer.

Embodiment 14 is the composite membrane according to embodiment 13, wherein the microporous layer is adjacent to or defines the second major surface of the porous substrate.

Embodiment 15 is the composite membrane according to any one of embodiments 1 through 14, wherein the porous substrate comprises a macroporous layer.

Embodiment 16 is the composite membrane according to embodiment 15, wherein the macroporous layer is adjacent to or defines the second major surface of the porous substrate.

Embodiment 17 is the composite membrane according to any one of embodiments 1 through 16, wherein the porous substrate has a thickness measured from one to the other of the opposite major surfaces in the range of from 5 µm up to and including 500 µm.

Embodiment 18 is the composite membrane according to embodiment 11 or 12 wherein the nanoporous layer has a thickness in the range of from 0.01 µm up to and including 10 µm.

Embodiment 19 is the composite membrane according to embodiment 13 or 14, wherein the microporous layer has a thickness in the range of from 5 µm up to and including 300 µm.

Embodiment 20 is the composite membrane according to embodiment 15 or 16, wherein the macroporous layer has a thickness in the range of from 25 µm up to and including 500 µm.

Embodiment 21 is the composite membrane according to any one of embodiments 1 through 20, wherein the porous substrate comprises pores having an average size in the range of from 0.5 nanometers (nm) up to and including 1000 µm.

Embodiment 22 is the composite membrane according to any one of embodiments 11, 12, and 21, wherein the nanoporous layer comprises pores having a size in the range of from 0.5 nanometers (nm) up to and including 100 nm.

Embodiment 23 is the composite membrane according to any one of embodiments 13, 14, and 21, wherein the microporous layer comprises pores having a size in the range of from 0.01 µm up to and including 20 µm.

Embodiment 24 is the composite membrane according to any one of embodiments 15, 16, and 21, wherein the macroporous layer comprises pores having a size in the range of from 1 µm up to and including 1000 µm.

Embodiment 25 is the composite membrane according to any one of embodiments 1 through 24, wherein the pore-filling polymer is crosslinked, grafted to the porous substrate, or both.

Embodiment 26 is the composite membrane according to any one of embodiments 1 through 25, wherein the pore-filling polymer is crosslinked and/or grafted to a nanoporous substrate.

Embodiment 27 is the composite membrane according to any one of embodiments 1 through 26, wherein the starting materials for the pore-filling polymer comprise ethylenically unsaturated monomers and/or oligomers.

Embodiment 28 is the composite membrane according to embodiment 27, wherein the starting materials for the polymer comprise (meth)acrylate-containing monomers and/or oligomers.

Embodiment 29 is the composite membrane according to embodiment 28, wherein the (meth)acrylate-containing monomers and/or oligomers are selected from the group of a polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H,6H,6H-perfluorohydroxyldiacrylate, a urethane diacrylate, a urethane hexa-acrylate, a urethane triacrylate, a polymeric tetrafunctional acrylate, a polyester penta-acrylate, an epoxy diacrylate, a polyester triacrylate, a polyester tetra-acrylate, an amine-modified polyester triacrylate, an alkoxylated aliphatic diacrylate, an ethoxylated bisphenol di(meth)acrylate, a propoxylated triacrylate, 2-acrylamido-2-methylpropanefulfonic acid (AMPS), and combinations of such monomers and/or oligomers.

Embodiment 30 is the composite membrane of embodiment 29, wherein the (meth)acrylate-containing monomers and/or oligomers are selected from the group of a polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H,6H,6H-perfluorohydroxyldiacrylate, a polyester tetra-acrylate, and combinations of such monomers and/or oligomers.

Embodiment 31 is the composite membrane according embodiment 28, wherein the (meth)acrylate-containing monomers and/or oligomers are selected from one or more of the following:
(a) di(meth)acryl-containing compounds;
(b) tri(meth)acryl-containing compounds;
(c) higher functionality (meth)acryl-containing compounds;
(d) oligomeric (meth)acryl compounds;
(e) perfluoroalkyl meth(acryl)-containing compounds;
(f) charged meth(acryl)-containing compounds; and
(g) polar meth(acryl)-containing compounds.

Embodiment 32 is the composite membrane according to any one of embodiments 1 through 31, wherein the pore-filling polymer swells in the presence of alcohol but not gasoline.

Embodiment 33 is the composite membrane according to any one of embodiments 1 through 30, wherein the pore-filling polymer is a polyethylene glycol (PEG) polymer or copolymer.

Embodiment 34 is the composite membrane according any one of embodiments 1 through 30, wherein the pore-filling polymer comprises a major amount of crosslinked multifunctional (meth)acrylate.

Embodiment 35 is the composite membrane according to any one of embodiments 1 through 34, wherein the pore-filling polymer is in the form of a pore-filling polymer layer that forms at least a portion of the first major surface of the porous substrate.

Embodiment 36 is the composite membrane according to any one of embodiments 1 through 35, wherein the pore-filling polymer is in the form of a pore-filling polymer layer having an exposed major surface, which coats the first major surface of the porous substrate, and an opposite major surface disposed between the opposite first and second major surfaces of the porous substrate.

Embodiment 37 is the composite membrane according to embodiment 36, wherein the exposed major surface of the pore-filling polymer layer coats all the first major surface of the porous substrate.

Embodiment 38 is the composite membrane according to any one of embodiments 1 through 37, wherein the pore-filling polymer layer has a thickness in the range of from 10 nm up to and including 20,000 nm.

Embodiment 39 is the composite membrane according to any one of embodiments 1 through 38, wherein the pore-filling polymer exhibits an alcohol selectivity in the range of from at least 30% up to and including 100%.

Embodiment 40 is the composite membrane according to any one of embodiments 1 through 37, wherein the pore-filling polymer exhibits an average alcohol permeate (e.g., alcohol from an alcohol/gasoline mixture) flux in the range of from at least 310 g/m$^2$/hour up to and including 30 kg/m$^2$/hour, using a feed temperature in the range of from at least 20° C. up to and including 95° C., a permeate vacuum pressure in the range of from at least 20 Torr (2.67 kPa) up to and including 760 Torr (101 kPa), a feed pressure in the range of at least 10 psi (69 kPa) up to and including 100 psi (690 kPa), and an alcohol concentration in feed gasoline/alcohol mixture in the range of from at least 2% up to and including 20%.

Embodiment 41 is a composite membrane comprising: a porous substrate comprising opposite first and second major surfaces, and a plurality of pores; and a pore-filling polymer disposed in at least some of the pores so as to form a continuous layer having a thickness, wherein the pore-filling polymer comprises a major amount of crosslinked multi-functional (meth)acrylate (i.e. methacrylate and acrylates). The composite membrane can be an asymmetric membrane, with the amount of the pore-filling polymer at or adjacent to the first major surface being greater than the amount of the pore-filling polymer at or adjacent to the second major surface.

Embodiment 42 is a composite membrane according to any one of embodiments 1 through 41 wherein the pore-filling polymer comprises one or more additives selected from a polymeric additive, particulate, and photoinitiator.

Embodiment 43 is a composite membrane of embodiment 42 wherein the pore-filling polymer comprises a polymeric additive selected from polyacrylic acid, polymethacrylic acid, polyacrylamide or its copolymers, polyethylene oxide, polyvinyl alcohol, poly(ethylene-co-vinyl alcohol) (EVAL), poly(N-vinylpyrrolidone), and combinations thereof.

Embodiment 44 is a cartridge for separating alcohol from an alcohol and gasoline mixture, the cartridge comprising an asymmetric composite membrane according to any one of embodiments 1 through 43.

Embodiment 45 is the cartridge according to embodiment 44 having a volume in the range of from 200 milliliters (mL), or from 500 mL, up to and including 5.000 liters (L).

Embodiment 46 is the cartridge according to embodiment 45 having a volume of 1.000 liters.

Embodiment 47 is a fuel separation system comprising the cartridge according to any one of embodiments 44 through 46.

Embodiment 48 is a method of separating a first liquid from a mixture of the first liquid and a second liquid, the method comprising contacting the mixture with an asymmetric composite membrane according to any one of embodiments 1 through 43.

Embodiment 49 is the method according to embodiment 48, wherein the first liquid is an alcohol and the second liquid is gasoline.

Embodiment 50 is the method according to embodiment 49, which is carried out under the following conditions: a feed temperature in the range of from at least 20° C. up to and including 95° C., a permeate vacuum pressure in the range of from at least 20 Torr (2.67 kPa) up to and including 760 Torr (101 kPa), a feed pressure in the range of at least 10 psi (69 kPa) up to and including 100 psi (690 kPa), and an alcohol concentration in feed gasoline/alcohol mixture in the range of from at least 2% up to and including 20%.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Test Procedures

Method 1

Figure 4:
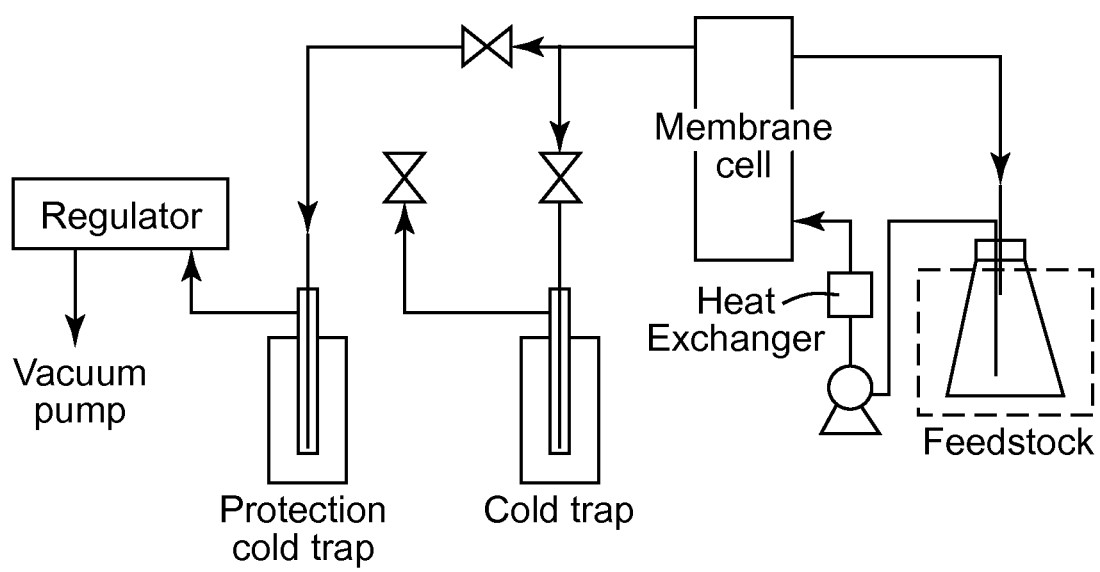
FIG. 4 is an illustration of a vacuum pervaporation testing apparatus.
Figure 5:
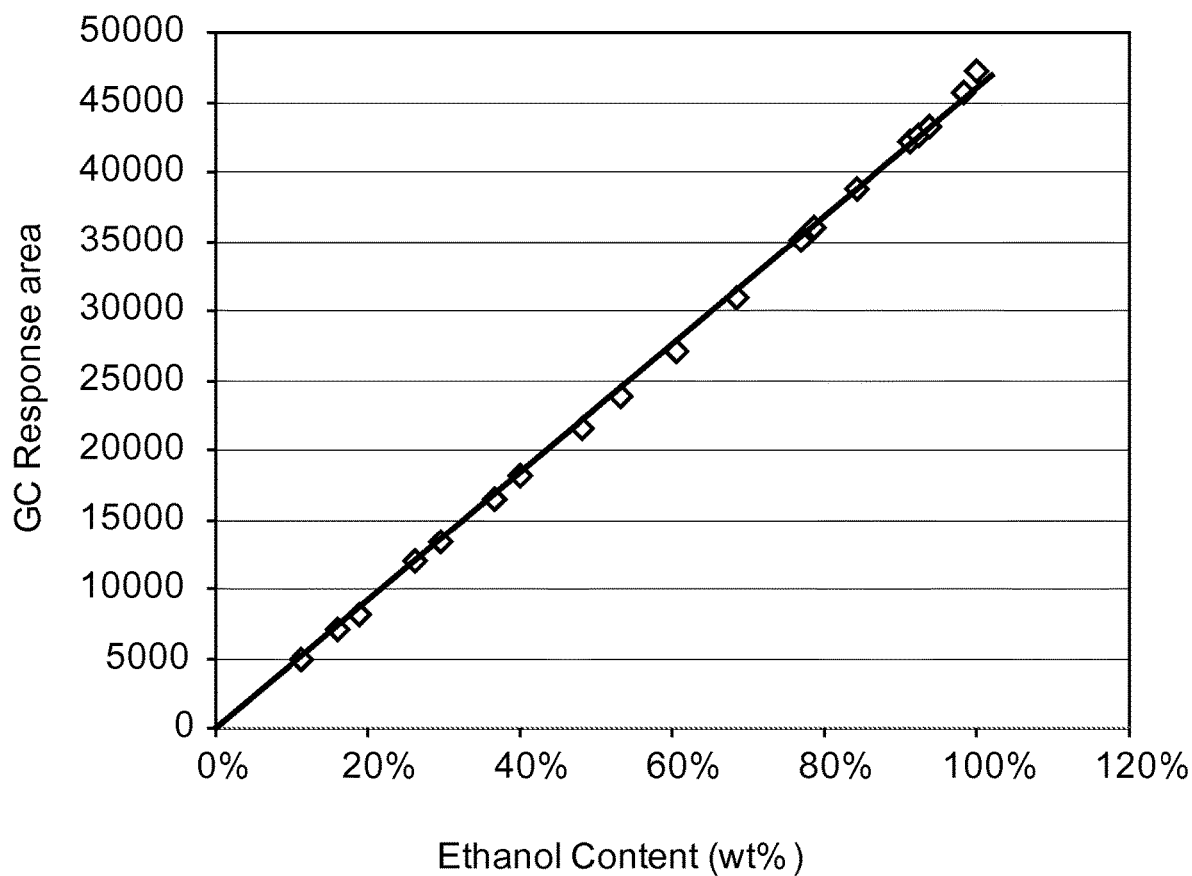
FIG. 5 is a graph of the GC response area vs ethanol concentration (y=45948x; $R^2$=0.9988).

The ability of the membranes to separate ethanol and gasoline from an ethanol/gasoline mixture was determined using the test apparatus depicted in FIG. 4 and the following technique. The membrane sample was mounted onto a stainless steel cell (Sepa CF II, obtained from General Electric Co., Fairfield, Conn.). The effective membrane surface area was 140 cm$^2$. A feedstock of E10 gasoline (10% ethanol, obtained from Marathon Oil Co., Houston, Tex.) was heated by a heat exchanger and pumped through the membrane cell at a flow rate of 300-500 mL/min. The input and output temperatures of the feedstock at the inlet and outlet of the membrane cell was measured with thermometers. The permeate was collected in a cold trap cooled with liquid nitrogen. The membrane cell vacuum was controlled by a regulator connected to a vacuum pump. Testing was performed at three conditions: 70° C. feedstock temperature and 200 Torr (26.7 kPa) vacuum, 50° C. feedstock temperature and 85 Torr (11.3 kPa) vacuum, and 21-22° C. at 20 Torr (2.67 kPa) vacuum. The total permeate mass flux was calculated as: Flux=m/(A×t) where m is the mass of the permeate in kilograms (kg); A is the effective membrane area in square meters (m$^2$); and t is the permeate collection duration time in hours (h). The ethanol content of the permeate and the feedstock were measured by gas chromatography (GC) using a Hewlett Packard Model 5890A or 7890C gas chromatograph. The alcohol content was determined by using a calibration line shown in FIG. 5, obtained by running known concentrations of ethanol through the GC and measuring the GC response area. Then the response area measurements of the permeate and feedstock from the GC were obtained, and then using the calibration line, the % ethanol was determined. Ethanol mass flux was calculated as membrane mass flux multiplied by the ethanol concentration in the permeate.

Method 2

The ability of the membranes to separate ethanol from an ethanol/gasoline mixture was determined as in Method 1 above except the test apparatus was run in a continuous mode after charging the initial test vessel with 1.1 liters of gasoline. Testing was conducted until the gasoline feed stream at the inlet of the membrane cell was less than 2.0 wt-%. The flow rate of the feed stream was maintained at 500 mL/min. Vacuum in the membrane permeate side was set at 200 Torr (26.7 kPa) and the average gasoline temperature at the inlet and outlet of the membrane cell was maintained at 70° C. Permeate samples were collected every 5-10 minutes. The average total mass flux was calculated based on the ethanol obtained from all the permeate samples collected over the total testing time.

Example 1

Figure 6:
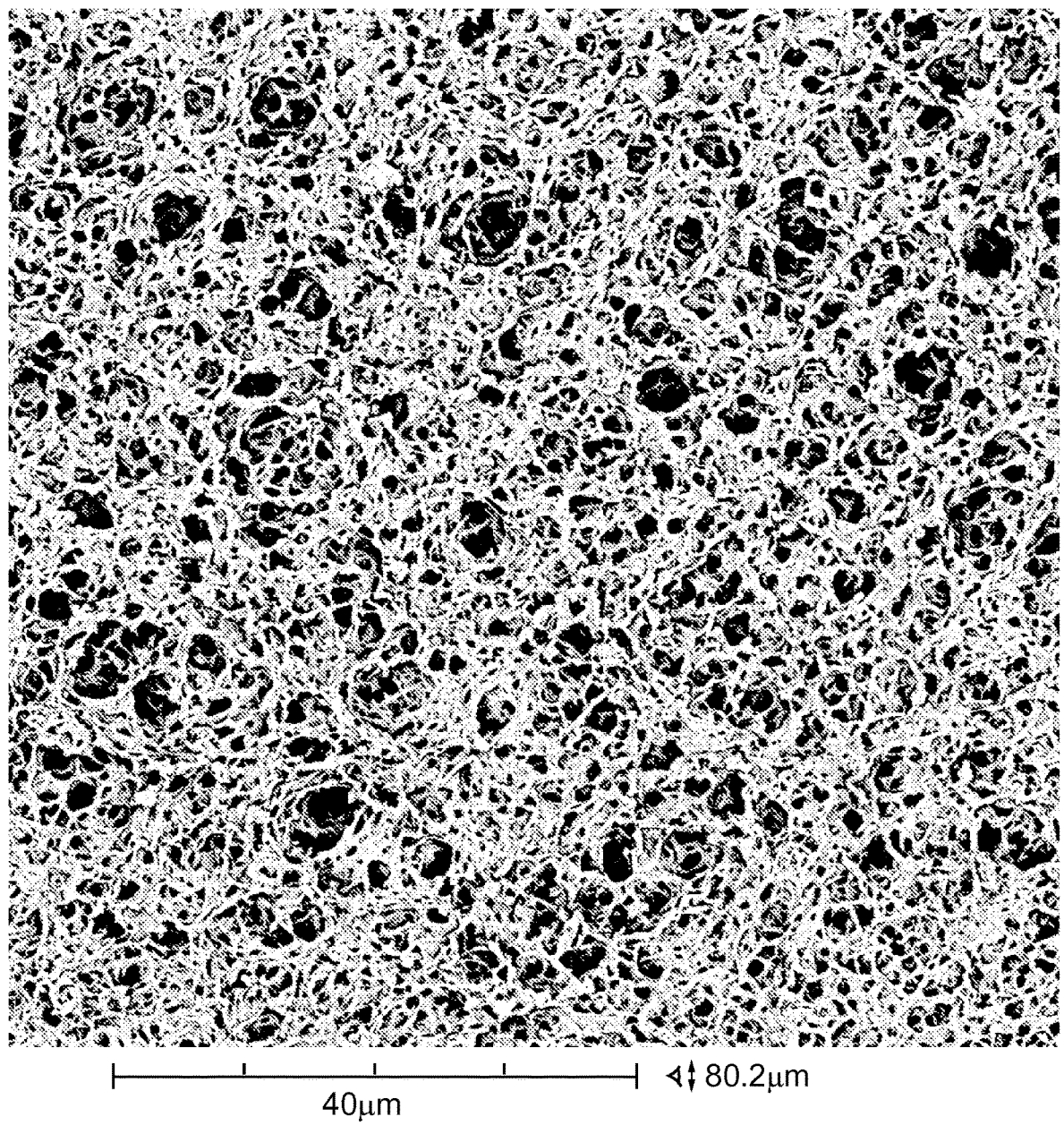
FIG. 6 is an SEM photograph (3000×) of the small pore side of the porous substrate used to make the composite membrane in Example 1.
Figure 7:
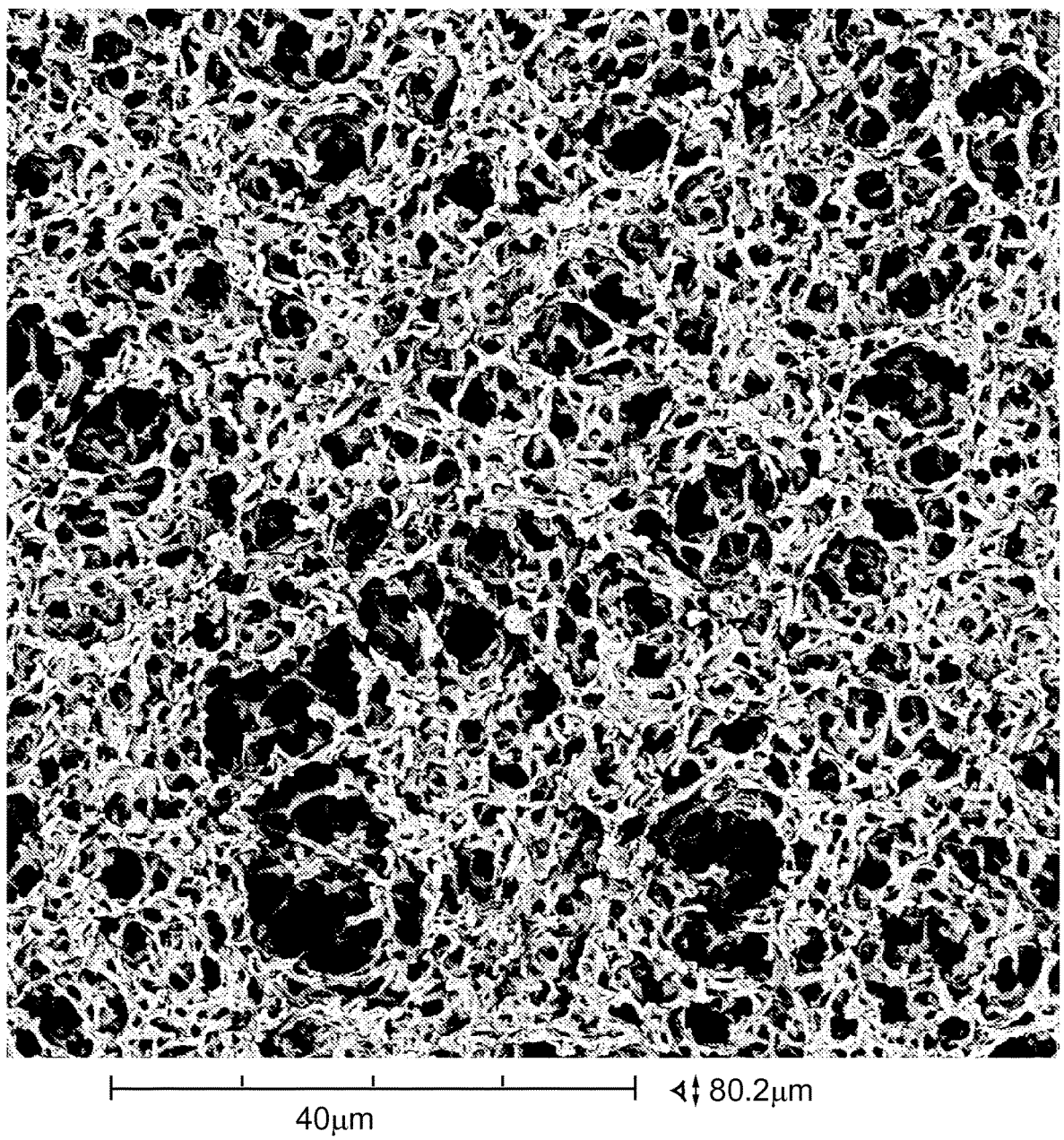
FIG. 7 is an SEM photograph (3000×) of the large pore side of the porous substrate used to make the composite membrane in Example 1.

An asymmetric pore filled membrane was prepared using a microporous nylon substrate (BLA020, obtained from 3M Purification Inc., Meriden, Conn.). This porous substrate is described as having a tight/small surface on one side with an average pore size of 0.2 micron and an open/large surface on an opposite side with an average pore size of 0.65 micron. FIG. 6 is an SEM photomicrograph of the small pore surface of the membrane. FIG. 7 is an SEM photomicrograph of the large pore surface of the membrane.

Figure 8:
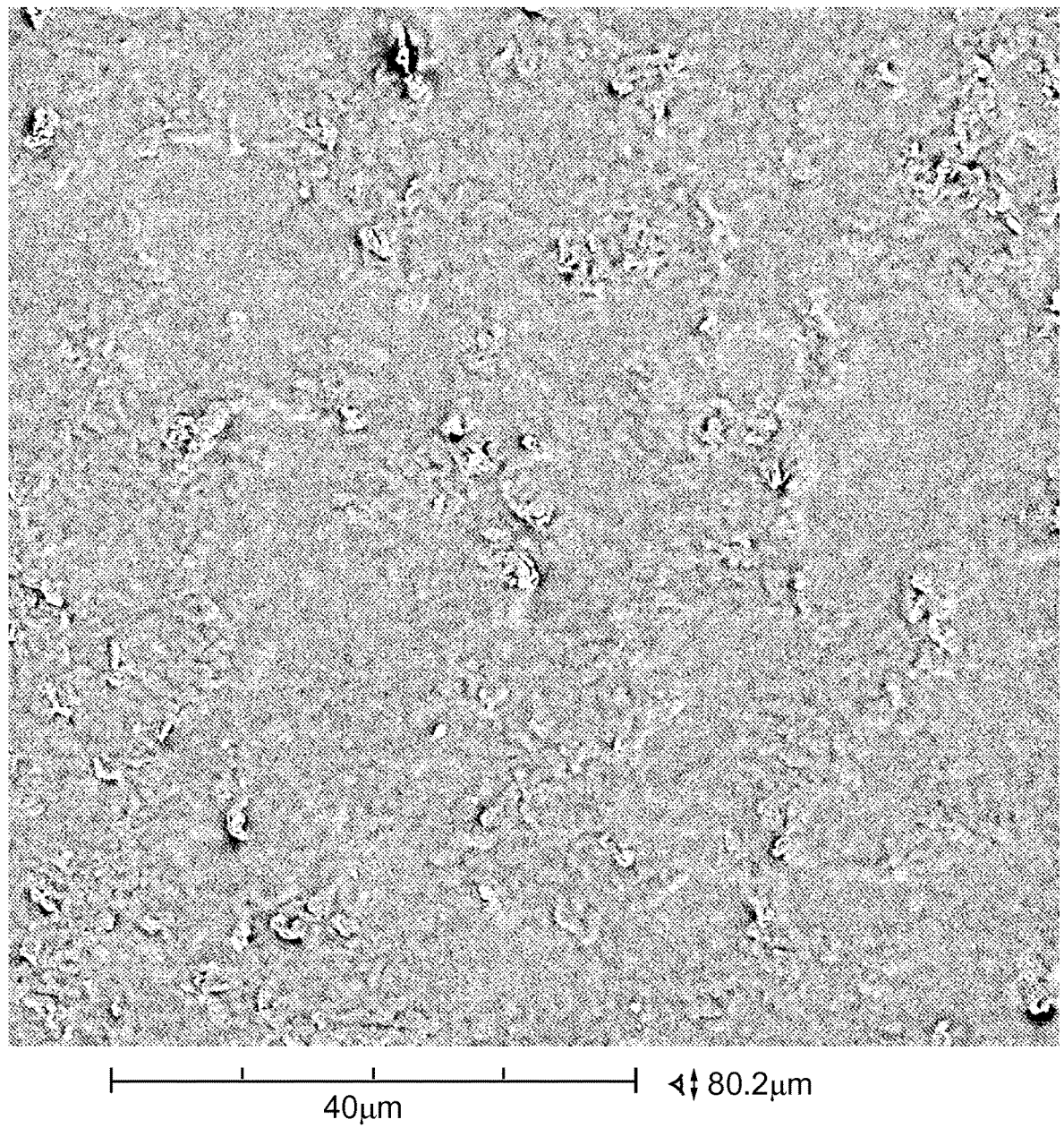
FIG. 8 is an SEM photograph (3000×) of the irradiated pore-filled side of the composite membrane according to Example 1.
Figure 9:
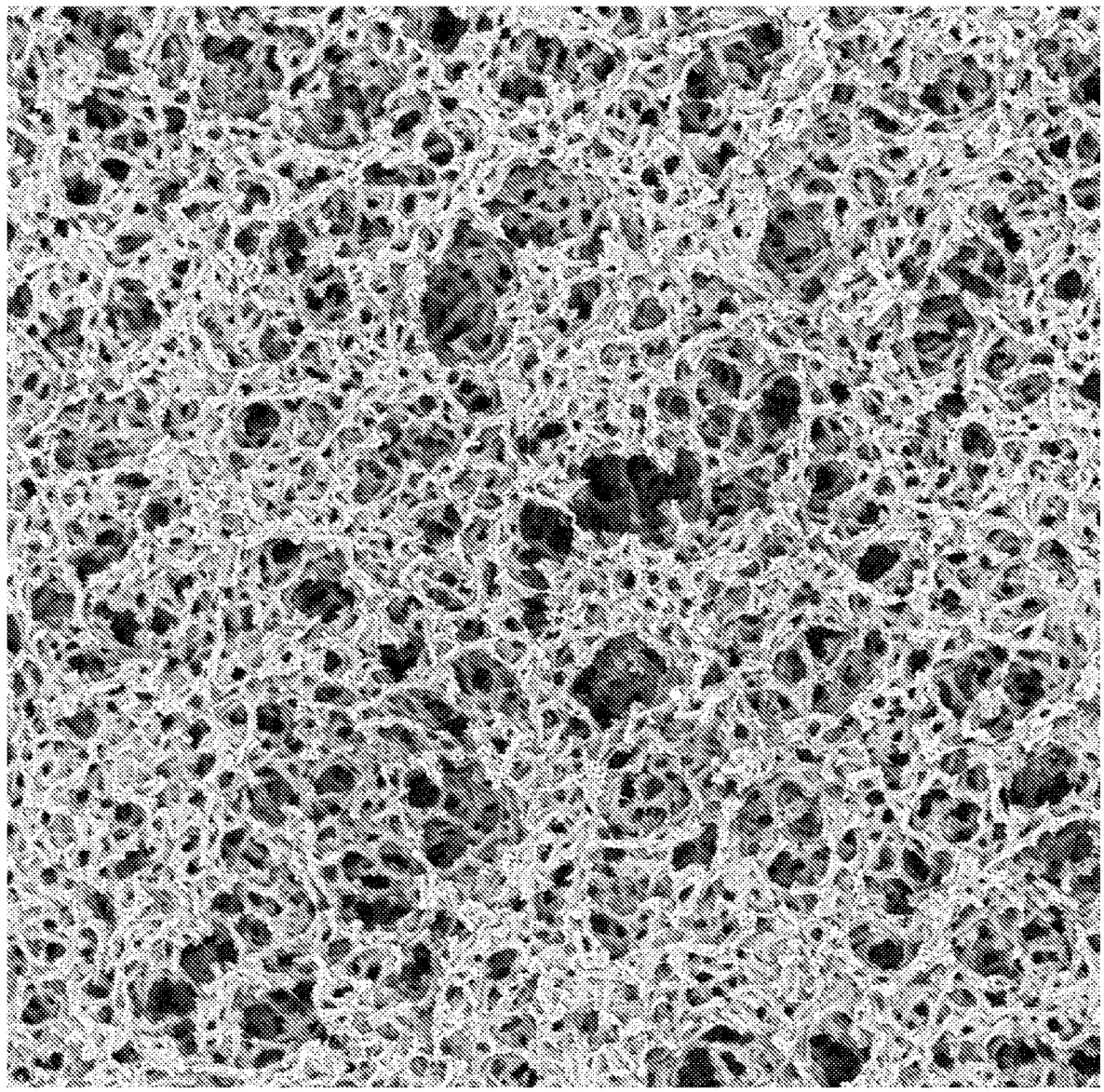
FIG. 9 is an SEM photograph (3000×) of the non-irradiated side of the composite membrane according to Example 1.

A pore-filling polymer solution was prepared by mixing 20.0 wt-% of polyethylene glycol 400 diacrylate (SR344, obtained from Sartomer, Exton, Pa.) into 80.0 wt-% deionized water. A BLA020 porous substrate (15 cm×25 cm) was placed into a polyethylene bag containing the pore-filling polymer solution to completely saturate and impregnate the porous substrate. The pore-filled substrate was removed from the bag and taped onto an aluminum panel (32 mm thick×38 cm width×51 cm length) with the tight/small pore side facing upwards. The panel was fed into an ultraviolet (UV) chamber on a moving belt running at a line speed of 6.1 meters/minute (m/min). The chamber was run with an inert nitrogen atmosphere and was equipped with a Fusion H lamp with an aluminum reflector as the UV source to polymerize and cross-link the SR344 acrylate. The UV cured pore-filled substrate was removed from the plate and washed with deionized water to remove any uncured polymer solution and then dried at room temperature. FIG. 8 is an SEM photomicrograph of the irradiated pore-filled small pore surface of the resulting composite membrane. FIG. 9 is an SEM photomicrograph of the non-irradiated large pore surface of the composite membrane.

The composite membrane was tested using Method 1 above except the gasoline feed temperature was maintained at approximately 27-31° C. at 20 Torr vacuum and the results are reported in Table 1 below.

Example 2

An asymmetric pore filled membrane was prepared as in Example 1 above. The resulting composite membrane was tested using Method 1 above except the gasoline feed temperature was maintained at approximately 21-22° C. at 20 Torr (2.67 kPa) vacuum and the results are reported in Table 1 below.

Example 3

An asymmetric pore filled membrane was prepared as in Example 2 above except the pore-filling polymer solution was prepared by mixing 30.0 wt-% of polyethylene glycol 400 diacrylate (SR344), 2.0 wt-% titanium (IV) oxide (APS powder 32 nanometer particle size, obtained from Alfa Aesar, Mass.) into 68.0 wt-% deionized water with an ultrasonic bath for 30 minutes. The line speed into the UV chamber was set at 3.05 meters/minute (m/min). The resulting composite membrane was tested using Method 1 above except the gasoline feed temperature was maintained at approximately 21-22° C. at 20 Torr (2.67 kPa) vacuum and the results are reported in Table 1 below.

Example 4

An asymmetric pore filled membrane was prepared as in Example 1 above except the pore-filling polymer solution was prepared by mixing 30 wt-% of polyethylene glycol 400 diacrylate (SR344) with Nalco 2326 (ammonia stabilized colloidal silica, 14.5% colloidal silica as Sift; particle size 5 nm; obtained from Nalco Chemical Company, Naperville, Ill.) in deionized water. The solution contained 30.0 wt-% SR344, 5.0 wt-% silica nanoparticles and 65.0 wt-% deionized water.

The line speed into the UV chamber was set at 12.2 m/min. The resulting composite membrane was tested using Method 1 above except the gasoline feed temperature was maintained at approximately 21-22° C. at 20 Torr (2.67 kPa)vacuum and the results are reported in Table 1 below.

Example 5

An asymmetric pore filled membrane was prepared as in Example 1 above except the pore-filling polymer solution was prepared by mixing 30.0 wt-% of polyethylene glycol 400 diacrylate (SR344) with Nalco 2326 (ammonia stabilized colloidal silica, 14.5% colloidal silica as Sift; particle size 5 nm; obtained from Nalco Chemical Company, Naperville, Ill.) in deionized water. The solution contained 30.0 wt-% SR344, 10.0 wt-% silica nanoparticles and 60 wt-% deionized water.

The line speed into the UV chamber was set at 12.2 m/min. The resulting composite membrane was tested using Method 1 above except the gasoline feed temperature was maintained at approximately 21-22° C. at 20 Torr (2.67 kPa) vacuum and the results are reported in Table 1 below.

Example 6A

Figure 10:
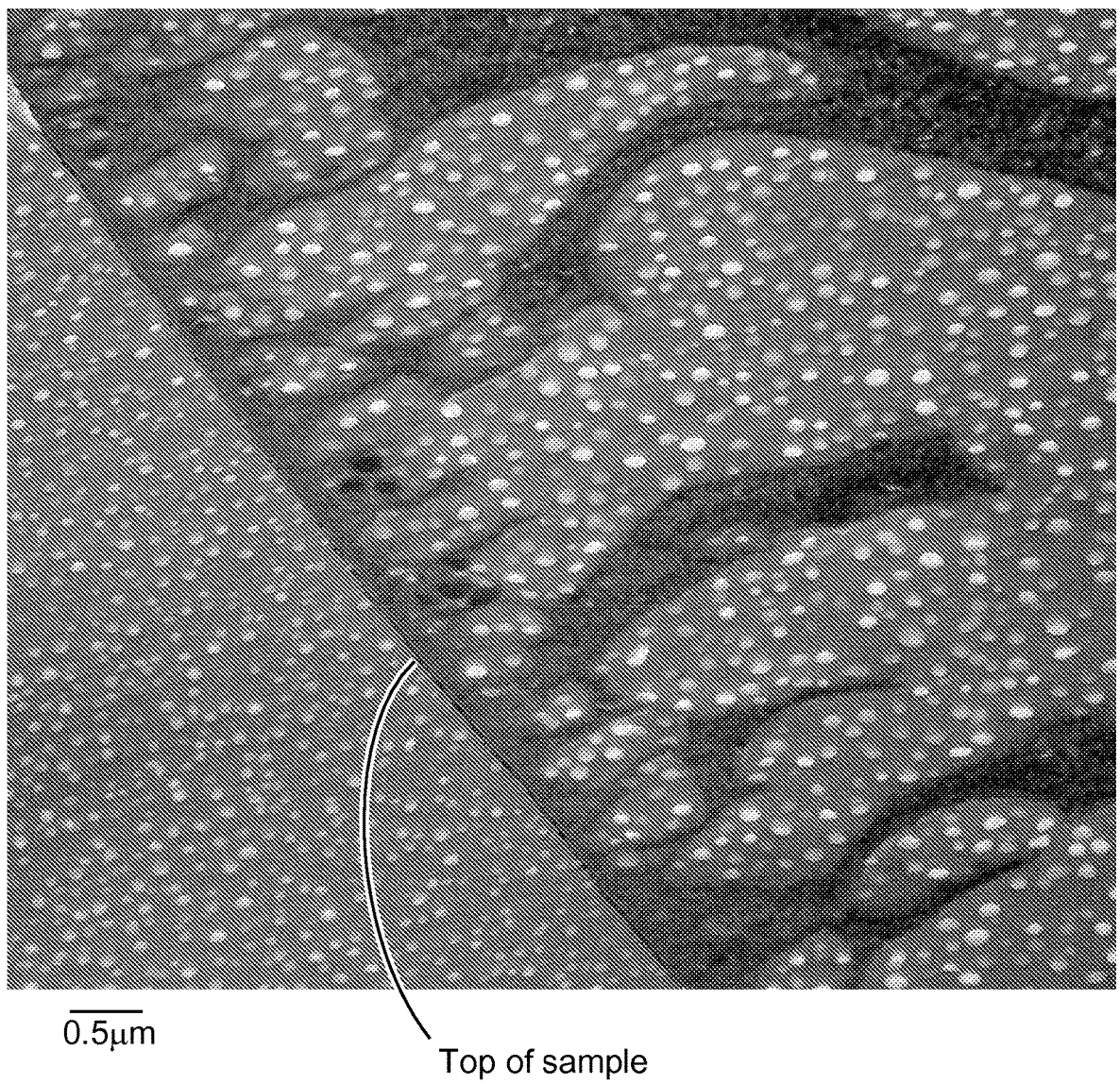
FIG. 10 is a TEM image of a cross-section of the porous substrate according to Example 6.
Figure 11:
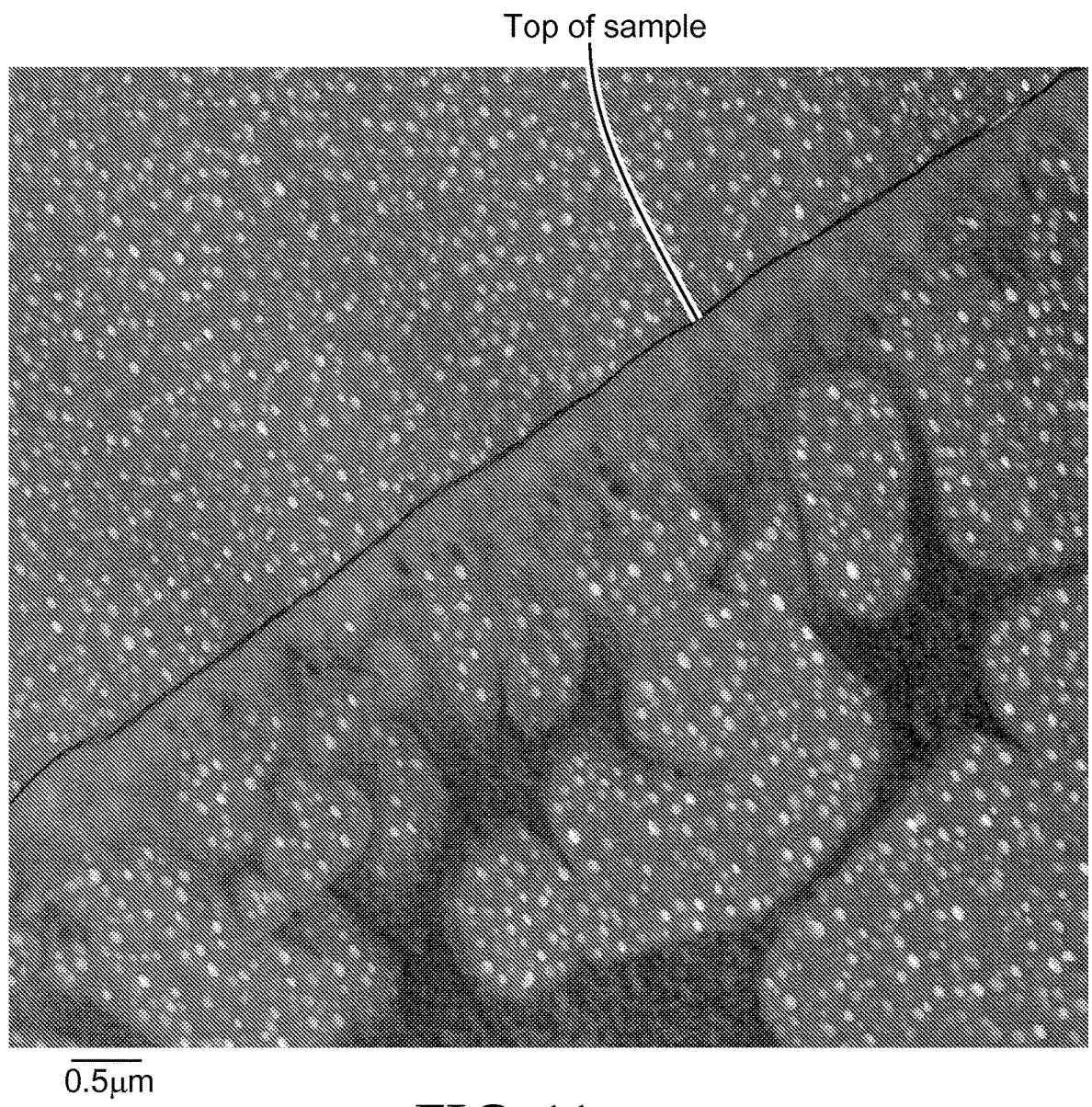
FIG. 11 is a TEM image of a cross-section of the asymmetric composite membrane according to Example 6.

An asymmetric pore filled membrane was prepared as in Example 1 above except a polyethersulfone nanoporous substrate (PES900C/D, obtained from Sepro Membranes Inc. Oceanside, Calif.) was used as the substrate. The pore-filling polymer solution was prepared by mixing 40 wt-% of SR344 into 60 wt-% deionized water. The line speed was set at 12.2 m/min. The resulting composite membrane was tested using Method 1 above except the gasoline feed temperature was maintained at approximately 21-22° C. at 20 Torr (2.67 kPa) vacuum and a feedstock flow rate of 300 mL/min. The results are reported in Table 1 below. FIGS. 10 and 11 are transmission electrophotomicrographs (TEM) of the cross-section of the nanoporous substrate (FIG. 10) and the resulting composite membrane (FIG. 11).

Example 6B

An asymmetric pore filled membrane was prepared as in Example 6A above except the gasoline feed temperature was maintained at approximately 53° C. at 20 Torr (2.67 kPa) vacuum. The results are reported in Table 1 below.

Example 7A

An asymmetric pore filled membrane was prepared as in Example 6A above except the line speed was set at 6.1 m/min. The results are reported in Table 1 below.

Example 7B

An asymmetric pore filled membrane was prepared as in Example 6B above except the line speed was set at 6.1 m/min. The results are reported in Table 1 below.

Example 8A

An asymmetric pore filled membrane was prepared as in Example 6A above except a polyacrylonitrile nanoporous substrate (PAN450, obtained from Sepro Membranes Inc. Oceanside, Calif.) was used as the substrate. The results are reported in Table 1 below.

Example 8B

An asymmetric pore filled membrane was prepared as in Example 8A above except the gasoline feed temperature was maintained at approximately 53° C. at 20 Torr (2.67 kPa) vacuum. The results are reported in Table 1 below.

Example 9

An asymmetric pore filled membrane was prepared as in Example 1 above except a polyethersulfone nanoporous substrate (PES2, obtained from Sepro Membranes Inc., Oceanside, Calif.) was used as a substrate. The pore-filling solution was prepared by mixing 22.0 wt-% of polyethylene glycol 600 diacrylate (SR610, obtained from Sartomer, Exton, Pa.) in a 10.0 wt-% sodium chloride (NaCl) deionized water solution. A dichroic reflector was used in place of the aluminum reflector. The line speed was set at 6.1 m/min. The resulting composite membrane was tested using Method 1 (70° C.) above. The results are reported in Table 1 below.

Example 10

An asymmetric pore filled membrane was prepared as in Example 9 above except the UV irradiation was carried out in a standard air atmosphere. There was approximately 20% oxygen in the atmosphere. The resulting composite membrane was tested using Method 1 (70° C.) above. The results are reported in Table 1 below.

Example 11

An asymmetric pore filled membrane was prepared using a polyethersulfone nanoporous substrate (PES5, obtained from Sepro Membranes Inc. Oceanside, Calif.) was used as a substrate. A silicone diacrylate (EBECRYL 350 ("EB350") obtained from Cytec Industries, Smyrna, Ga.) was used as the pore-filling polymer. An excess amount of the EB350 was applied to the surface of the substrate and spread evenly using a rod. A 3 minute diffusion time was allowed before blotting the excessive surface solution using a paper towel. UV irradiation of the pore-filled substrate was performed as in Example 1 except a dichroic reflector was used. The line speed was set at 6.1 m/min. The UV cured pore-filled substrate was washed in ethanol to remove any uncured polymer solution and then dried and tested using Method 1 above except the gasoline feed temperature was maintained at approximately 50° C. The results are reported in Table 1 below.

Example 12

An asymmetric pore filled membrane was prepared as in Example 11 above except the pore-filling solution was prepared by mixing 10.0 wt-% of a triacrylate (SR454, ethoxylated 3-trimethylolpropane triacrylate, obtained from Sartomer, Exton, Pa.) with 90.0 wt-% of EB350. The UV cured pore-filled substrate was washed in ethanol to remove any uncured polymer solution and then dried and tested using Method 1 (50° C.) above with the results reported in Table 1 below. The resulting composite membrane was also tested using Method 2 above with the results reported in Table 2 below.

Example 13

An asymmetric pore filled membrane was prepared as in Example 11 above except the pore-filling solution was prepared by mixing 20.0 wt-% of trimethylolpropane triacrylate (TMPTA, obtained from Alfa Aesar, Ward Hill, Mass.) with 80.0 wt-% of EB350. The UV cured pore-filled substrate was washed in ethanol to remove any uncured polymer solution and then dried and tested using Method 1 (50° C.) above with the results reported in Table 1 below. The resulting composite membrane was also tested using Method 2 above with the results reported in Table 2 below.

Example 14

An asymmetric pore filled membrane was prepared as in Example 11 above except the pore-filling solution was prepared by mixing 20.0 wt-% of polyethylene glycol 200 diacrylate (SR259, obtained from Sartomer, Exton, Pa.) with 80.0 wt-% of EB350. The UV cured pore-filled substrate was washed in ethanol to remove any uncured polymer solution and then dried and tested using Method 1 (50° C.) above with the results reported in Table 1 below.

Example 15

An asymmetric pore filled membrane was prepared as in Example 11 above except the pore-filling solution was prepared by mixing 20.0 wt-% of SR344 with 80.0 wt-% of EB350. The UV cured pore-filled substrate was washed in ethanol to remove any uncured polymer solution and then dried and tested using Method 1 (50° C.) above with the results reported in Table 1 below.

Example 16

An asymmetric pore filled membrane was prepared as in Example 11 above except the pore-filling solution was prepared by mixing 20.0 wt-% of SR610 with 80.0 wt-% of EB350. The UV cured pore-filled substrate was washed in ethanol to remove any uncured polymer solution and then dried and tested using Method 1 (50° C.) above with the results reported in Table 1 below.

Example 17

An asymmetric pore filled membrane was prepared as in Example 11 above except the pore-filling solution was prepared by mixing 30.0 wt-% of glycerol triacetate (GTA, obtained from Univar USA, Redmond, Wash.) with 70.0 wt-% of a blend of TMPTA (20.0%) and EB350 (80.0%). The UV cured pore-filled substrate was washed in ethanol to remove any uncured polymer solution and then dried and tested using Method 1 (50° C.) above with the results reported in Table 1 below.

Example 18

An asymmetric pore filled membrane was prepared as in Example 11 above except the pore-filling solution was prepared by mixing 30.0 wt-% of GTA with 70.0 wt-% of a blend of SR259 (20.0%) and EB350 (80.0%). The UV cured pore-filled substrate was washed in ethanol to remove any uncured polymer solution and then dried and tested using Method 1 (50° C.) above with the results reported in Table 1 below.

Example 19

An asymmetric pore filled membrane was prepared as in Example 11 above except the pore-filling solution was prepared by mixing 50.0 wt-% of GTA with 50.0 wt-% of a blend of SR259 (20%) and EBACRYL E350 (80%). The UV cured pore-filled substrate was washed in ethanol to remove any uncured polymer solution and then dried and tested using Method 1 (50° C.) above with the results reported in Table 1 below.

Example 20

An asymmetric pore filled membrane was prepared as in Example 11 above except the pore-filling solution was prepared by mixing 50.0 wt-% of dibutyl sebacate (DBS obtained from Vertellus Performance Materials, Inc., Greensboro, N.C.) with 50.0 wt-% of EB350. The UV cured pore-filled substrate was washed in ethanol to remove any uncured polymer solution and then dried and tested using Method 1 (50° C.) above with the results reported in Table 1 below.

Example 21

An asymmetric pore filled membrane was prepared as in Example 1 above except polyethersulfone nanoporous substrate (PES2) was used as the substrate. The pore-filling polymer solution was prepared by mixing 40.0 wt-% of polyethylene glycol 400 dimethacrylate (SR603OP obtained from Sartomer, Exton, Pa.) with 60.0 wt-% of deionized water. A dichroic reflector was used in place of the aluminum reflector. The line speed was set at 12.2 m/min. The UV cured pore-filled substrate was washed in deionized water to remove any uncured polymer solution and then dried and tested using Method 1 (70° C.) above with the results reported in Table 1 below.

Example 22

An asymmetric pore filled membrane was prepared as in Example 21 above except the pore-filling solution was prepared by mixing 40.0 wt-% of SR603OP with 60.0 wt-% of DBS. The line speed was set at 12.2 m/min. The UV cured pore-filled substrate e was washed in ethanol to remove any uncured polymer solution and then dried and tested using Method 1 (70° C.) above with the results reported in Table 1 below.

Example 23

An asymmetric pore filled membrane was prepared as in Example 22 above except the pore-filling solution was prepared by mixing 40.0 wt-% of methoxy polyethylene glycol 550 monoacrylate (CD553, obtained from Sartomer, Exton, Pa.) with 60.0 wt-% of DBS. The line speed was set at 12.2 m/min. An aluminum reflector was used in the UV chamber. The UV cured pore-filled substrate was washed in ethanol to remove any uncured polymer solution and then dried and tested using Method 1 (70° C.) above with the results reported in Table 1 below. FIG. 12 is an SEM photomicrograph of the cross-section of the irradiated pore-filled resulting composite membrane. The thickness of the top, irradiated/cured layer was measured to be approximately 200 nanometers.

Example 24

An asymmetric pore filled membrane was prepared as in Example 23 above except the pore-filling solution was prepared by mixing 40.0 wt-% of methoxy polyethylene glycol 550 monoacrylate (CD552, obtained from Sartomer, Exton, Pa.) with 60.0 wt-% of DBS. The UV cured pore-filled substrate was washed in ethanol to remove any uncured polymer solution and then dried and tested using Method 1 (70° C.) above with the results reported in Table 1 below.

Example 25

An asymmetric pore filled membrane was prepared as in Example 21 above except a polyethersulfone nanoporous substrate (PES5) was used as the substrate. The pore-filling solution was prepared by mixing 40.0 wt-% of 2-hydroxyl methacrylate (HEMA, obtained from Alfa Aesar, Ward Hill, Mass.) with 60.0 wt-% of deionized water. The line speed was set at 6.1 m/min. A dichroic reflector was used. The UV cured pore-filled substrate was washed in ethanol to remove any uncured polymer solution and then dried and tested using Method 1 (50° C.) above with the results reported in Table 1 below.

Example 26

An asymmetric pore filled membrane was prepared as in Example 25 above except the pore-filling solution was prepared by mixing 20.0 wt-% of SR344 with 80.0 wt-% of deionized water. A polyethersulfone nanoporous substrate (PES5) was used as the substrate. The UV cured pore-filled substrate was washed in ethanol to remove any uncured polymer solution and then dried and tested using Method 1 (50° C.) above with the results reported in Table 1 below.

Example 27

An asymmetric pore filled membrane was prepared as in Example 26 above except the pore-filling solution was prepared by mixing 20.0 wt-% of SR344 with 79.9 wt-% of deionized water. 0.1 wt-% a photoinitiator (1-[4-(2-Hydroxyethoxy)-phenyl]-2-hydroxy-2-methyl-1-propane-1-one, IRGACURE® 2959, obtained from BASF Corp., Florham Park, N.J.) was added to the polymer solution. The UV cured pore-filled substrate was washed in ethanol to remove any uncured polymer solution and then dried and tested using Method 1 (50° C.) above with the results reported in Table 1 below.

Example 28

An asymmetric pore filled membrane was prepared as in Example 11 above except the pore-filling solution was prepared by mixing 10.0 wt-% of SR454 with 90.0 wt-% of GTA. A 3 minute diffusion time was allowed before blotting the excessive surface solution using a paper towel. UV irradiation of the pore-filled substrate was performed as in Example 11. The UV cured pore-filled substrate was washed in ethanol to remove any uncured polymer solution and then dried and tested using Method 1 (50° C.) above with the results reported in Table 1 below.

Example 29

An asymmetric pore filled membrane was prepared as in Example 28 above except the pore-filling solution was prepared by mixing 10.0 wt-% of 1H,1H,6H,6H-perflourohexyldiacrylate (FHDA, obtained from Oakwood Products, West Columbia, S.C.) with 90.0 wt-% of GTA. A one minute diffusion time was allowed before blotting the excessive surface solution using a paper towel before UV irradiation. The line speed was set at 6.1 m/min. A dichroic reflector was used. The UV cured pore-filled substrate was washed in ethanol to remove any uncured polymer solution and then dried and tested using Method 1 (50° C.) above with the results reported in Table 1 below.

Example 30

An asymmetric pore filled membrane was prepared as in Example 29 above except the pore-filling solution was prepared by mixing 50.0 wt-% of FHDA with 50.0 wt-% of GTA. The UV cured pore-filled substrate was washed in ethanol to remove any uncured polymer solution and then dried and tested using Method 1 (50° C.) above with the results reported in Table 1 below.

Example 31

An asymmetric pore filled membrane was prepared as in Example 29 above except the pore-filling solution was prepared by mixing 80.0 wt-% of polypropylene glycol 900 diacrylate (PPG900DA, obtained from Sigma Aldrich, Milwaukee, Wis.) with 20.0 wt-% of GTA. The UV cured pore-filled substrate was washed in ethanol to remove any uncured polymer solution and then dried and tested using Method 1 (50° C.) above with the results reported in Table 1 below.

Example 32

An asymmetric pore filled membrane was prepared as in Example 31 above except the pore-filling solution was prepared by mixing 80.0 wt-% PPG900DA with 20.0 wt-% of SR344. The UV cured pore-filled substrate was washed in ethanol to remove any uncured polymer solution and then dried and tested using Method 1 (50° C.) above with the results reported in Table 1 below.

Example 33

An asymmetric pore filled membrane was prepared as in Example 25 above except the pore-filling solution was prepared by mixing 20.0 wt-% SR610 with 80.0 wt-% of deionized water. The UV cured pore-filled substrate was washed in de-ionzied water to remove any uncured polymer solution and then dried and tested using Method 1 (50° C.) above with the results reported in Table 1 below.

Example 34

An asymmetric pore filled membrane was prepared as in Example 33 above except the pore-filling solution was prepared by mixing 20.0 wt-% SR610 with 78.0 wt-% of deionized water and 2.0 wt-% sodium chloride (NaCl). The UV cured pore-filled substrate was washed in deionized water to remove any uncured polymer solution and then dried and tested using Method 1 (50° C.) above with the results reported in Table 1 below.

Example 35

An asymmetric pore filled membrane was prepared as in Example 34 above except the pore-filling solution was prepared by mixing 20.0 wt-% SR610 with 77.8 wt-% of deionized water and 2.0 wt-% sodium chloride (NaCl) and 0.2 wt-% N,N'-methylenebisacrylamide (BIS, obtained from Alfa Aesar, Ward Hill, Mass.). The UV cured pore-filled substrate was washed in deionized water to remove any uncured polymer solution and then dried and tested using Method 1 (50° C.) above with the results reported in Table 1 below.

Example 36

An asymmetric pore filled membrane was prepared as in Example 34 above except the pore-filling solution was prepared by mixing 15.0 wt-% SR610 with 78.4 wt-% of deionized water and 6.0% NaCl and 0.6 wt-% BIS. The UV cured pore-filled substrate was washed in deionized water to remove any uncured polymer solution and then dried and tested using Method 1 (50° C.) above with the results reported in Table 1 below. The resulting composite membrane was also tested using Method 2 (70° C.) above with the results reported in Table 2 below.

Example 37

An asymmetric pore filled membrane was prepared as in Example 34 above except the pore-filling solution was prepared by mixing 15.0 wt-% SR415 (ethoxylated trimethylolpropane triacrylate, obtained from Sartomer, Exton, Pa.) with 78.4 wt-% of deionized water and 6% NaCl and 0.6 wt-% BIS. The UV cured pore-filled substrate was washed in deionized water to remove any uncured polymer solution and then dried and tested using Method 1 (50° C.) above with the results reported in Table 1 below.

Example 38

An asymmetric pore filled membrane was prepared as in Example 34 above except the pore-filling solution was prepared by mixing 10.0 wt-% polyethylene glycol methylether methacrylate (PEGMMA, Mn-2080, obtained from Sigma Aldrich, Milwaukee, Wis.) with 89.2 wt-% of deionized water and 0.8 wt-% BIS. The UV cured pore-filled substrate was washed in deionized water to remove any uncured polymer solution and then dried and tested using Method 1 (50° C.) above with the results reported in Table 1 below.

Example 39

An asymmetric pore filled membrane was prepared as in Example 33 above except the pore-filling solution was prepared by mixing 20.0 wt-% polyester acrylate (CN2622, obtained from Sartomer Co., Exton, Pa.) with 80.0 wt-% GTA. The UV cured pore-filled substrate was washed in ethanol to remove any uncured polymer solution and then dried and tested using Method 1 (70° C.) above with the results reported in Table 1 below.

Example 40

An asymmetric pore filled membrane was prepared as in Example 38 above except the pore-filling solution was prepared by mixing 20.0 wt-% SR610 with 77.4 wt-% deionized water and 2.5 wt-% 2-acrylamido-2-methylpropanesulfonic acid (AMPS, obtained from Sigma Aldrich, Milwaukee, Wis.) and 0.1 wt-% IRGACURE 2959. A polyethersulfone nanoporous substrate (PES2) was used as the substrate. The line speed was set at 12.2 m/min. The UV irradiation was performed in a standard air atmosphere. The UV cured pore-filled substrate was washed in deionized water to remove any uncured polymer solution and then dried and tested using Method 1 (70° C.) above with the results reported in Table 1 below.

Example 41

An asymmetric pore filled membrane was prepared as in Example 40 above except the pore-filling solution was prepared by mixing 20.0 wt-% SR610 with 77.5 wt-% deionized water and 2.5 wt-% AMPS. The UV cured pore-filled substrate was washed in deionized water to remove any uncured polymer solution and then dried and tested using Method 1 (70° C.) above with the results reported in Table 1 below.

Example 42

An asymmetric pore filled membrane was prepared as in Example 40 above except the pore-filling solution was prepared by mixing 10 wt-% SR610 with 84.5 wt-% deionized water and 5.0 wt-% AMPS and 0.1 wt-% IRGACURE 2959. The line speed was 18.3 m/min. The UV cured pore-filled substrate was washed in ethanol to remove any uncured polymer solution and then dried and tested using Method 1 (70° C.) above with the results reported in Table 1 below.

Example 43

An asymmetric pore filled membrane was prepared as in Example 40 above except the pore-filling solution was prepared by mixing 20.0 wt-% SR610 with 75.0 wt-% deionized water and 5.0 wt-% AMPS. The UV cured pore-filled substrate was washed in deionized water to remove any uncured polymer solution and then dried and tested using Method 1 (70° C.) above with the results reported in Table 1 below.

Example 44

An asymmetric pore filled membrane was prepared as in Example 40 above except the pore-filling solution was prepared by mixing 5.0 wt-% SR344 with 90.0 wt-% deionized water and 5.0 wt-% AMPS. The line speed was 6.1 m/min. The UV cured pore-filled substrate was washed in deionized water to remove any uncured polymer solution and then dried and tested using Method 1 (70° C.) above with the results reported in Table 1 below.

Example 45

An asymmetric pore filled membrane was prepared using a polyethersulfone nanoporous substrate (PES5) was used a substrate. A pore-filling solution was prepared by mixing 60.0 wt-% of SR415 (obtained from Sartomer, Exton, Pa.) and 40.0 wt-% deionized water. An excess amount of the solution above was applied to the surface of the substrate and spread evening using a Mayer rod #8. A 1 min diffusion time was allowed before blotting the excessive surface solution using a paper towel. UV irradiation of the pore-filled substrate was performed as in Example 1. The line speed was set at 12.2 m/min. The UV cured pore-filled substrate was washed in deionized water at 50° C. for at least 2 hours and then dried and tested using method 1 at 70° C. feedstock temperature. The results are reported in Table 1.

Example 46

An asymmetric pore filled membrane was prepared as in Example 45 above except the pore-filling solution was prepared by mixing 60.0 wt-% SR415, 5.0 wt-% polyacrylic acid (weight average molecular weight (MW) approximately 1800, obtained from Alfa Aesar, Ward Hill, Mass.) and 35.0 wt-% deionized water. The UV cured pore-filled substrate was washed in deionized water at 50° C. for at least 2 hours and then dried and tested using method 1 at 70° C. feedstock temperature with the results reported in Table 1. In the presence of polyacrylic acid, both permeate ethanol concentration and ethanol mass flux increased.

Example 47

An asymmetric pore filled membrane was prepared as in Example 45 above except the pore-filling solution was prepared by mixing 60.0 wt-% SR610, and 40.0 wt-% deionized water. The UV cured pore-filled substrate was washed in deionized water at 50° C. for at least 2 hours and then dried and tested using method 1 at 70° C. feedstock temperature with the results reported in Table 1.

Example 48

An asymmetric pore filled membrane was prepared as in Example 45 above except the pore-filling solution was prepared by mixing 60.0 wt-% SR610, 5.0 wt-% polyacrylic acid (weight average MW approximately 1800) and 35.0 wt-% deionized water. The UV cured pore-filled substrate was washed in deionized water at 50° C. for at least 2 hours and then dried and tested using method 1 at 70° C. feedstock temperature with the results reported in Table 1. In the presence of polyacrylic acid, again both permeate ethanol concentration and ethanol mass flux increased.

Example 49

An asymmetric pore filled membrane was prepared as in Example 45 above except the pore-filling solution was prepared by mixing 60.0 wt-% SR610, 5.0 wt-% polyacrylic acid (weight average MW approximately 5000, obtained from Alfa Aesar, Ward Hill, Mass.) and 35.0 wt-% deionized water. The UV cured pore-filled substrate was washed in deionized water at 50° C. for at least 2 hours and then dried and tested using method 1 at 70° C. feedstock temperature with the results reported in Table 1.

TABLE 1

| Example # | Total Mass Flux (kg/m²/h) | Feed ethanol concentration | Permeate ethanol concentration | Ethanol Mass Flux (kg/m²/h) |
| --- | --- | --- | --- | --- |
| 1 | 5.49 | 9.3% | 34.1% | 1.87 |
| 2 | 1.85 | 8.0% | 39.3% | 0.73 |
| 3 | 0.55 | 8.9% | 50.3% | 0.28 |
| 4 | 1.45 | 9.5% | 43.5% | 0.63 |
| 5 | 1.15 | 10.7% | 49.5% | 0.57 |
| 6A | 1.39 | 8.6% | 59.6% | 0.83 |
| 6B | 5.59 | 9.3% | 66.6% | 3.72 |
| 7A | 0.73 | 11.2% | 75.5% | 0.55 |
| 7B | 3.08 | 9.2% | 78.4% | 2.41 |
| 8A | 2.03 | 9.0% | 54.9% | 1.11 |
| 8B | 6.43 | 9.7% | 49.9% | 3.21 |
| 9 | 9.10 | 9.0% | 57.7% | 5.25 |
| 10 | 5.84 | 7.2% | 68.3% | 3.99 |
| 11 | 6.64 | 7.6% | 42.1% | 2.80 |
| 12 | 4.47 | 7.7% | 57.0% | 2.55 |

TABLE 1-continued

| Example # | Total Mass Flux (kg/m$^2$/h) | Feed ethanol concentration | Permeate ethanol concentration | Ethanol Mass Flux (kg/m$^2$/h) |
|---|---|---|---|---|
| 13 | 2.78 | 8.8% | 65.1% | 1.81 |
| 14 | 0.65 | 9.4% | 95.2% | 0.62 |
| 15 | 0.51 | 7.4% | 84.4% | 0.43 |
| 16 | 0.89 | 9.5% | 94.6% | 0.84 |
| 17 | 3.60 | 9.9% | 60.0% | 2.16 |
| 18 | 0.86 | 8.7% | 89.5% | 0.77 |
| 19 | 2.63 | 9.1% | 63.6% | 1.67 |
| 20 | 5.38 | 10.6% | 62.6% | 3.37 |
| 21 | 6.79 | 7.7% | 52.6% | 3.57 |
| 22 | 8.10 | 7.4% | 62.9% | 5.09 |
| 23 | 11.14 | 7.5% | 39.6% | 4.41 |
| 24 | 6.28 | 7.8% | 50.0% | 3.14 |
| 25 | 1.90 | 8.5% | 39.8% | 0.76 |
| 26 | 7.24 | 9.1% | 58.4% | 4.23 |
| 27 | 5.31 | 9.8% | 55.8% | 2.96 |
| 28 | 0.80 | 8.6% | 82.2% | 0.66 |
| 29 | 1.37 | 9.2% | 77.8% | 1.07 |
| 30 | 0.51 | 9.7% | 93.3% | 0.48 |
| 31 | 19.74 | 8.3% | 23.7% | 4.68 |
| 32 | 1.32 | 8.4% | 82.5% | 1.09 |
| 33 | 5.36 | 7.8% | 63.1% | 3.38 |
| 34 | 7.42 | 9.1% | 61.0% | 4.53 |
| 35 | 5.75 | 9.3% | 64.6% | 3.71 |
| 36 | 4.48 | 9.5% | 70.0% | 3.14 |
| 37 | 3.80 | 9.7% | 71.6% | 2.72 |
| 38 | 0.92 | 8.8% | 74.5% | 0.69 |
| 39 | 4.10 | 7.3% | 63.9% | 2.62 |
| 40 | 11.93 | 9.3% | 51.4% | 6.13 |
| 41 | 6.13 | 8.7% | 65.4% | 4.01 |
| 42 | 3.50 | 8.1% | 74.6% | 2.61 |
| 43 | 5.43 | 8.5% | 71.2% | 3.87 |
| 44 | 1.88 | 8.1% | 78.6% | 1.48 |
| 45 | 4.40 | 9.2% | 55.9% | 2.48 |
| 46 | 4.60 | 9.0% | 59.1% | 2.70 |
| 47 | 3.90 | 8.9% | 62.6% | 2.41 |
| 48 | 4.29 | 8.9% | 69.7% | 2.99 |
| 49 | 4.70 | 9.2% | 68.0% | 3.20 |

TABLE 2

| Example # | Total Mass Flux (kg/m$^2$/h) | Permeate ethanol concentration | Average ethanol mass flux (kg/m$^2$/h) |
|---|---|---|---|
| 12 | 6.79 | 45.2% | 3.07 |
| 13 | 3.36 | 57.2% | 1.93 |
| 36 | 4.46 | 59.6% | 2.66 |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A method of separating alcohol from a mixture of alcohol and gasoline, the method comprising contacting the mixture with an asymmetric composite membrane comprising:
 a porous substrate comprising opposite first and second major surfaces, and a plurality of pores; and
 a pore-filling polymer disposed in at least some of the pores so as to form a layer coating all of the first major surface of the porous substrate and having a thickness within the porous substrate, with the amount of the pore-filling polymer at or adjacent to the first major surface being greater than the amount of the pore-filling polymer at or adjacent to the second major surface;
 wherein the starting materials for the pore-filling polymer include a (meth)acrylate-containing monomer and/or oligomer, and the starting materials for the pore-filling polymer also comprise one or more polymeric additives that (a) have a strong affinity with the pore-filling polymer so that the pore-filling polymer is reinforced by the one or more polymeric additives and (b) enter pores of the porous substrate with the starting materials and thereby form an interpenetrating polymer network, the polymeric additive is selected from polyacrylic acid, polymethacrylic acid, polyacrylamide or its copolymers, polyethylene oxide, polyvinyl alcohol, poly (ethylene-co-vinyl alcohol) (EVAL), poly(N-vinylpyrrolidone), and mixtures or copolymers thereof, the amount of polymeric additive is in the range of from at least 0.20 wt-% up to 75%, based on the total amount of pore-filling polymer plus polymeric additive, the molecular weight (weight average) of the polymeric additive is in the range of from 1,000 to 500,000; and
 wherein the pore-filling polymer is more permeable to alcohol than gasoline but not soluble in alcohol or gasoline.

2. The method according to claim 1, wherein the layer is a continuous layer.

3. The method according to claim 1, wherein the porous substrate is a polymeric porous substrate.

4. The method according to claim 1, wherein the porous substrate comprises a nanoporous layer.

5. The method according to claim 1, wherein the porous substrate comprises a microporous layer.

6. The method according to claim 1, wherein the porous substrate comprises a macroporous layer.

7. The method according to claim 1, wherein the porous substrate has a thickness measured from one to the other of the opposite major surfaces in the range of from 5 µm up to and including 500 µm.

8. The method according to claim 1, wherein the pores of the porous substrate include pores having an average size in the range of from 0.5 nanometers (nm) up to and including 1000 µm.

9. The method according to claim 1, wherein the pore-filling polymer is formed using starting materials comprising ethylenically unsaturated monomers and/or oligomers.

10. The method according to claim 1, wherein the pore-filling polymer is in the form of a pore-filling polymer layer that forms at least a portion of the first major surface of the porous substrate.

11. The method according to claim 1, wherein the pore-filling polymer is in the form of a pore-filling polymer layer having an exposed major surface, which coats the first major surface of the porous substrate, and an opposite major surface disposed between the opposite first and second major surfaces of the porous substrate.

12. The method according to claim 1, wherein the pore-filling polymer exhibits an alcohol selectivity in the range of from at least 30% up to and including 100%.

13. The method according to claim 1, wherein the pore-filling polymer exhibits an average alcohol permeate flux in the range of from at least 310 g/m$^2$/hour up to and including 30 kg/m$^2$/hour, using a feed temperature in the range of from at least 20 C up to and including 90 C, a permeate vacuum pressure in the range of from at least 20 Torr (2.67 kPa) up to and including 760 Torr (101 kPa), a feed pressure in the range of from at least 10 psi (69 kPa) up to and including 100 psi (690 kPa), and an alcohol concentration in feed mixture in the range of from at least 2% up to and including 20%.

14. The method according to claim 1, wherein the asymmetric composite membrane is in a replaceable cartridge for separating alcohol from an alcohol and gasoline mixture.

15. The method according to claim 1, wherein the porous substrate is a polymeric porous substrate that comprises a nanoporous layer, a microporous layer, and a macroporous layer.

16. The method according to claim 1, further comprising disposing the asymmetric composite membrane in a fuel system of an internal combustion engine, wherein the asymmetric composite membrane selectively pervaporates alcohol from an alcohol and gasoline fuel mixture stored in a storage tank.

17. The method according to claim 1, wherein the pore-filling polymer is formed using starting materials comprising ethylenically unsaturated (meth)acrylate-containing monomers and/or oligomers, selected from the group of a polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H,6H,6H-perfluorohydroxyldiacrylate, a urethane diacrylate, a urethane hexa-acrylate, a urethane triacrylate, a polymeric tetrafunctional acrylate, a polyester penta-acrylate, an epoxy diacrylate, a polyester triacrylate, a polyester tetra-acrylate, an amine-modified polyester triacrylate, an alkoxylated aliphatic diacrylate, an ethoxylated bisphenol di(meth)acrylate, a propoxylated triacrylate, 2-acrylamido-2-methylpropanefulfonic acid (AMPS), and combinations of such monomers and/or oligomers.

18. The method according to claim 17, wherein the (meth)acrylate-containing monomers and/or oligomers are selected from the group of a polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H,6H,6H-perfluorohydroxyldiacrylate, a polyester tetra-acrylate, and combinations of such monomers and/or oligomers.

19. The method according to claim 1, wherein the pore-filling polymer is formed using starting materials comprising ethylenically unsaturated (meth)acrylate-containing monomers and/or oligomers selected from one or more of the following:
(a) di(meth)acryl-containing compounds;
(b) tri(meth)acryl-containing compounds;
(c) higher functionality (meth)acryl-containing compounds;
(d) oligomeric (meth)acryl compounds;
(e) perfluoroalkyl meth(acryl)-containing compounds;
(f) charged meth(acryl)-containing compounds; and
(g) polar meth(acryl)-containing compounds.

* * * * *

UNITED STATES PATENT AND TRADEMARK OFFICE
CERTIFICATE OF CORRECTION

PATENT NO. : 10,766,004 B2
APPLICATION NO. : 15/108892
DATED : September 8, 2020
INVENTOR(S) : Jinsheng Zhou It is certified that error appears in the above-identified patent and that said Letters Patent is hereby corrected as shown below:

In the Specification

Column 4
Line 49, delete "nanopororous" and insert -- nanoporous --, therefor.

Column 6
Lines 45-46, delete "and or" and insert -- and/or --, therefor.
Line 59, delete "polyvinylidine" and insert -- polyvinylidene --, therefor.

Column 7
Lines 11-12, delete "polyvinylidine" and insert -- polyvinylidene --, therefor.
Line 21, delete "(imnminoadipoyliminodecamethylene)," and insert
-- (iminoadipoyliminodecamethylene), --, therefor.

Column 10
Line 47, delete "-methylpropanefulfonic" and insert -- -methylpropanesulfonic --, therefor.

Column 11
Line 35, delete "-methylpropanefulfonic" and insert -- -methylpropanesulfonic --, therefor.

Column 12
Line 45, delete "(dimethlamino)" and insert -- (dimethylamino) --, therefor.

Column 13
Line 2, delete "debutyl sebecate," and insert -- dibutyl sebacate, --, therefor.

Column 18
Line 15, delete "-methylpropanefulfonic" and insert -- -methylpropanesulfonic --, therefor.

Signed and Sealed this
Tenth Day of November, 2020

Andrei Iancu
*Director of the United States Patent and Trademark Office*

CERTIFICATE OF CORRECTION (continued)
U.S. Pat. No. 10,766,004 B2

Column 21
Line 66, delete "Sift;" and insert -- $SiO_2$; --, therefor.

Column 22
Line 16 (approx.), delete "Sift;" and insert -- $SiO_2$; --, therefor.

Column 25
Line 6, delete "EBACRYL" and insert -- EBECRYL --, therefor.

Column 26
Lines 65-66, delete "perflourohexyldiacrylate" and insert -- perfluorohexyldiacrylate --, therefor.

In the Claims

Column 32
Line 66, in Claim 13, delete "20 C" and insert -- 20° C. --, therefor.
Line 66, in Claim 13, delete "90 C," and insert -- 90° C., --, therefor.

Column 34
Lines 3-4, in Claim 17, delete "-methylpropanefulfonic" and insert -- -methylpropanesulfonic --, therefor.